(12) United States Patent
Ma

(10) Patent No.: US 12,501,283 B2
(45) Date of Patent: Dec. 16, 2025

(54) COMMUNICATION METHOD, APPARATUS, AND SYSTEM

(71) Applicant: HUAWEI TECHNOLOGIES CO., LTD., GuangDong (CN)

(72) Inventor: Ning Ma, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 300 days.

(21) Appl. No.: 18/188,675

(22) Filed: Mar. 23, 2023

(65) Prior Publication Data
US 2023/0224731 A1 Jul. 13, 2023

Related U.S. Application Data

(63) Continuation of application No. PCT/CN2020/117590, filed on Sep. 25, 2020.

(51) Int. Cl.
H04W 24/02 (2009.01)
H04B 3/54 (2006.01)
H04W 24/04 (2009.01)
H04W 88/08 (2009.01)

(52) U.S. Cl.
CPC ............ H04W 24/02 (2013.01); H04B 3/54 (2013.01); H04W 24/04 (2013.01); H04W 88/085 (2013.01)

(58) Field of Classification Search
CPC ............ H04B 3/54–546; H04W 24/04; H04W 88/08–10; H04L 41/06–0695
See application file for complete search history.

(56) References Cited

U.S. PATENT DOCUMENTS

| 10,158,525 | B2* | 12/2018 | Shor | H04W 24/04 |
| 10,419,081 | B2* | 9/2019 | Dong | H04B 7/0404 |
| 2006/0126617 | A1 | 6/2006 | Cregg et al. | |
| 2007/0076595 | A1* | 4/2007 | Lee | H04B 3/54 370/315 |
| 2012/0204084 | A1* | 8/2012 | Zhang | H04W 24/08 714/799 |
| 2015/0334666 | A1* | 11/2015 | Griffioen | H04W 56/002 370/350 |
| 2017/0012668 | A1* | 1/2017 | Fang | H04W 88/085 |
| 2017/0264344 | A1* | 9/2017 | Dong | H04Q 3/0075 |
| 2019/0058505 | A1* | 2/2019 | Fang | H04W 88/085 |
| 2019/0098519 | A1* | 3/2019 | Liu | H04W 24/00 |

(Continued)

FOREIGN PATENT DOCUMENTS

| CN | 101860802 A | * 10/2010 |
| CN | 103347274 A | 10/2013 |

(Continued)

Primary Examiner — Brendan Y Higa
(74) Attorney, Agent, or Firm — Rimon PC

(57) ABSTRACT

Embodiments of this application provide a communication method, apparatus, and system. In the method, after a first remote radio unit (RRU) determines that a link between the first RRU and a baseband unit (BBU) is in an abnormal state, the first RRU sends information about the first RRU and/or information about an optical module connected to the first RRU to at least one second RRU by using a power line communication (PLC) module in the first RRU. The first RRU is connected to the at least one second RRU by using a power line, and a PLC module is also disposed in the at least one second RRU.

16 Claims, 13 Drawing Sheets

(56) References Cited

U.S. PATENT DOCUMENTS

| | | | |
|---|---|---|---|
| 2020/0205017 A1* | 6/2020 | Takahashi | H04W 24/04 |
| 2021/0051494 A1* | 2/2021 | Anand | H04L 41/0654 |
| 2022/0417104 A1* | 12/2022 | Zhang | H04W 56/001 |

FOREIGN PATENT DOCUMENTS

| | | |
|---|---|---|
| CN | 108541082 A | 9/2018 |
| EP | 3119122 A1 | 1/2017 |
| EP | 3217707 A1 | 9/2017 |
| WO | 2017113196 A1 | 7/2017 |

\* cited by examiner

Moment 1

Moment 2

Moment 3

○ Optical module —— Optical fiber
▨ PLC module — · — Power line

COMMUNICATION METHOD, APPARATUS, AND SYSTEM

CROSS-REFERENCE TO RELATED APPLICATION

This application is a continuation of International Application No. PCT/CN2020/117590, filed on Sep. 25, 2020, the disclosure of which is hereby incorporated by reference in its entirety.

TECHNICAL FIELD

This application generally relates to the field of communication technologies, and in particular, to a communication method, apparatus, and system.

BACKGROUND

A base station may include a baseband unit (BBU) and at least one remote radio unit (RRU). The BBU is connected to the at least one RRU through an optical fiber, and the BBU may manage the at least one RRU through optical fiber communication.

In an actual application process, an optical fiber communication link between a BBU and an RRU involves the BBU, an optical fiber, an optical module, and the RRU. When the communication link between the BBU and the RRU is faulty, the fault usually needs to be located. The fault in the communication link between the BBU and the RRU may be caused by reasons such as: a fault in the BBU device, a fault in an optical module of the BBU, a fault in the optical fiber between the BBU and the RRU, a fault in an optical module on an RRU side, or a fault in the RRU device.

However, when the communication link between the BBU and the RRU is faulty, the link between the BBU and the RRU is disconnected in these cases. Therefore, if the fault in the communication link between the BBU and the RRU is caused by the fault in the optical fiber between the BBU and the RRU, the fault in the optical module on the RRU side, or the fault in the RRU device, because the BBU cannot automatically obtain information about the RRU, manual intervention is required to located the fault. This is a time-consuming and laborious operation. As a result, the base station cannot be efficiently maintained.

A solution to the foregoing problem is not provided in conventional technologies.

SUMMARY

In view of the foregoing problem, this application provides a communication method, apparatus, and system, so that communication may still be performed between a baseband unit (BBU) and a remote radio unit (RRU) even if a fault occurs in an optical fiber communication link between the BBU and the RRU, to fast locate the link fault.

According to a first aspect, an embodiment of this application provides a communication method, applied to a first RRU. The method includes: the first RRU determines that a link between the first RRU and a BBU is in an abnormal state; and the first RRU sends first information to at least one second RRU by using a power line communication (PLC) module in the first RRU. The first information includes information about the first RRU and/or information about an optical module connected to the first RRU, the first RRU is connected to the at least one second RRU via a power line, and a PLC module is disposed in the at least one second RRU.

In the foregoing process, a PLC module is disposed in an RRU, and different RRUs are connected by using a power line, so that PLC may be performed between different RRUs by using PLC modules. In this way, after the link between the BBU and the first RRU is faulty, the first RRU may send the information about the first RRU and/or the information about the optical module connected to the first RRU to the BBU by using the at least one second RRU, so that the BBU may quickly determine fault information of the link, to fast locate a link fault. In addition, the faulty link may be maintained in time, thereby improving efficiency of maintaining a base station.

In a possible implementation, the first RRU may send the first information to the at least one second RRU in the following manner: the first RRU broadcasts the first information to the at least one second RRU by using the PLC module in the first RRU.

In this implementation, the RRUs communicate with each other in a broadcast manner, and a relay device does not need to be added to an existing power supply system (including a power supply and a power line). This requires low costs and has high feasibility.

In a possible implementation, the first RRU may determine, in the following manner, that the link between the first RRU and the BBU is in the abnormal state: when the first RRU does not receive a heartbeat packet from the BBU within first duration, the first RRU determines that the link is in the abnormal state.

In this implementation, the first RRU may conveniently and accurately determine a status of the link between the first RRU and the BBU based on the heartbeat packet.

In a possible implementation, the information about the first RRU includes at least one of the following types of information: an identifier of the first RRU, information about a radio frequency module of the first RRU, a bit error rate of the communication link between the first RRU and the BBU, a running duration of the first RRU, or a quantity of reset times of the first RRU in a first time period.

In this implementation, the BBU may quickly and accurately locate a fault in the first RRU based on the information about the first RRU, leading to high efficiency and high accuracy of fault locating.

In a possible implementation, the information about the optical module includes at least one of the following types of information: an identifier of the optical module, optical power of the optical module, a bias current of the optical module, device information of the optical module, or fault information of the optical module.

In this implementation, the BBU may quickly and accurately locate a fault in the optical module based on the information about the optical module, leading to high efficiency and high accuracy of fault locating.

According to a second aspect, an embodiment of this application provides a communication method, applied to a second RRU. The method includes: receiving first information from a first RRU by using a PLC module in the second RRU, and sending the first information to a BBU. The first information includes information about the first RRU and/or information about an optical module connected to the first RRU, the first RRU is connected to the second RRU through a power line, and the PLC module is disposed in the second RRU.

In the foregoing process, a PLC module is disposed in an RRU, and different RRUs are connected by using a power line, so that PLC may be performed between different RRUs by using PLC modules. In this way, after a link between the BBU and the first RRU is faulty, the first RRU may send the information about the first RRU and/or the information about the optical module connected to the first RRU to the BBU by using at least one second RRU, so that the BBU may determine fault information of the link in time, to fast locate a link fault. In addition, the faulty link may be maintained in time, thereby improving efficiency of maintaining a base station.

In a possible implementation, when it is determined that the second RRU is an assistant RRU of the first RRU, the second RRU sends the first information to the BBU.

In this implementation, the second RRU sends the first information to the BBU only when the second RRU is the assistant RRU of the first RRU. In this way, an excessive number of RRUs may be prevented from sending the first information to the BBU, thereby reducing signaling overheads.

In a possible implementation, the second RRU may determine that the second RRU is the assistant RRU of the first RRU in the following manner: obtaining second information, and determining that the second RRU is the assistant RRU of the first RRU based on the second information, where the second information includes an identifier of the first RRU.

In this implementation, the second RRU may quickly determine whether the second RRU is the assistant RRU of the first RRU based on the second information, leading to high communication efficiency.

In a possible implementation, the second RRU may obtain the second information in the following manner: receiving the second information from the BBU or the first RRU; or obtaining the second information from preset storage space.

In this implementation, the second RRU may quickly obtain the second information from the preset storage space.

In a possible implementation, the information about the first RRU includes at least one of the following types of information: an identifier of the first RRU, information about a radio frequency module of the first RRU, a running duration of the first RRU, or a quantity of reset times of the first RRU in a first time period.

In this implementation, the BBU may quickly and accurately locate a fault in the first RRU based on the information about the first RRU, leading to high efficiency and high accuracy of fault locating.

In a possible implementation, the information about the optical module includes at least one of the following types of information: an identifier of the optical module, optical power of the optical module, a bit error rate of the optical module, a bias current of the optical module, device information of the optical module, or fault information of the optical module.

In this implementation, the BBU may quickly and accurately locate a fault in the optical module based on the information about the optical module, leading to high efficiency and high accuracy of fault locating.

According to a third aspect, an embodiment of this application provides a communication method, applied to a BBU. The method includes: receiving first information sent by a second RRU, and determining fault information based on the first information, where the first information includes information about a first RRU and/or information about an optical module connected to the first RRU, the first RRU is connected to the second RRU through a power line, and a PLC module is disposed in each of the first RRU and the second RRU.

In the foregoing process, a PLC module is disposed in an RRU, and different RRUs are connected by using a power line, so that PLC may be performed between different RRUs by using PLC modules. In this way, after a link between the BBU and the first RRU is faulty, the first RRU may send the information about the first RRU and/or the information about the optical module connected to the first RRU to the BBU by using at least one second RRU, so that the BBU may determine fault information of the link in time, to fast locate a link fault. In addition, the faulty link may be maintained in time, thereby improving efficiency of maintaining a base station.

In a possible implementation, the fault information includes at least one of the following information: a fault in the first RRU, a fault in the optical module connected to the first RRU, or a fault in an optical fiber between the first RRU and the BBU.

In a possible implementation, the BBU further determines that an assistant RRU of the first RRU is the second RRU, and sends second information to the second RRU, where the second information includes an identifier of the first RRU.

In this implementation, the BBU determines an assistant RRU of an RRU. The BBU may determine the assistant RRU for the first RRU based on a current assistant RRU allocation case of each RRU. In this way, rationality that the BBU determines the obtained assistant RRU is high, and this prevents some RRUs from assisting a plurality of RRUs or prevents some RRUs from not having RRUs requiring assistance.

In a possible implementation, the information about the first RRU includes at least one of the following information: an identifier of the first RRU, information about a radio frequency module of the first RRU, running duration of the first RRU, or a quantity of reset times of the first RRU in a first time period.

In this implementation, the BBU may quickly and accurately locate a fault in the first RRU based on the information about the first RRU, leading to high efficiency and high accuracy of fault locating.

In a possible implementation, the information about the optical module includes at least one of the following information: an identifier of the optical module, optical power of the optical module, a bit error rate of the optical module, a bias current of the optical module, device information of the optical module, or fault information of the optical module connected to the first RRU.

In this implementation, the BBU may quickly and accurately locate a fault in the optical module based on the information about the optical module, leading to high efficiency and high accuracy of fault locating.

In a related technology, with the rapid development of communication technologies, corresponding consumed power also increases. Currently, a power-saving design of base station shutdown is mainly to turn off a power amplifier of an RRU module or even directly turn off an RRU module, and then enable a dormant RRU module to exit a current dormant state through an optical fiber communication link between a BBU and an RRU according to an actual requirement. However, to avoid that the BBU cannot enable the RRU to exit the current dormant state, when the RRU is dormant, an interface in the BBU and the RRU is usually not disabled. The interface still has high power consumption. Therefore, it is expected that the interface in the BBU and the RRU may be disabled to save energy of a base station. However, if the interface in the BBU and the RRU is disabled, the RRU module cannot exit the current dormant state as required. Therefore, an embodiment of this application provides the following communication method, to resolve a problem that when entering a deep dormant state, an RRU cannot exit the current dormant state as required.

Because a dormant state of a base station may be classified into a plurality of dormancy levels, exiting a current dormant state may mean restoring a normal operating state, or may mean only exiting the current dormant state but still entering another dormant state with a poorer energy saving effect.

According to a fourth aspect, an embodiment of this application provides a communication method, applied to a BBU. The method includes: determining that a first RRU is to exit a dormant state; and sending third information to a second RRU, where the third information indicates the first RRU to exit the dormant state, where the first RRU is connected to the second RRU through a power line, and a PLC module is disposed in each of the first RRU and the second RRU. That the first RRU enters the dormant state includes at least one of the following: turning off a laser of an optical module connected to the first RRU, stopping supplying power to an optical module connected to the first RRU, or disabling a circuit between the first RRU and an optical module connected to the first RRU.

In the foregoing process, the first RRU may enter a deep dormant state according to an actual requirement, to reduce power consumption. When the BBU needs the first RRU to exit the dormant state, the BBU may send the third information (the third information indicates the first RRU to exit the current dormant state) to the second RRU by using an optical fiber. The second RRU may send the third information to the first RRU by using a power line, to enable the first RRU to exit the dormant state. In the foregoing process, the first RRU may enter the deep dormant state, so that an interface in the RRU and the BBU is in an off state, thereby reducing power consumption.

In a possible implementation, the third information indicates the second RRU to enable, by using the PLC module in the second RRU, the first RRU to exit the current dormant state.

In a possible implementation, the optical module connected to the first RRU includes at least one of the following: an optical module disposed in the first RRU, an optical module disposed in the BBU and configured to communicate with the first RRU, an optical module disposed in a cascaded RRU of the first RRU, or an optical module disposed in a front RRU of the first RRU and connected to the first RRU.

According to a fifth aspect, an embodiment of this application provides a communication method, applied to a second RRU. The method includes: receiving third information from a BBU, where the third information indicates a first RRU to exit a dormant state; and sending the third information to the first RRU by using a PLC module in the second RRU, where the first RRU is connected to the second RRU through a power line, and a PLC module is disposed in each of the first RRU and the second RRU.

In the foregoing process, the first RRU may enter a deep dormant state according to an actual requirement, to reduce power consumption. When the BBU needs the first RRU to exit the dormant state, the BBU may send the third information (the third information indicates the first RRU to exit the current dormant state) to the second RRU by using an optical fiber. The second RRU may send the third information to the first RRU by using a power line, to enable the first RRU to exit the dormant state. In the foregoing process, the first RRU may enter the deep dormant state, so that an interface in the RRU and the BBU is in an off state, thereby reducing power consumption.

In a possible implementation, the sending the third information to the first RRU by using a PLC module in the second RRU includes: determining that no optical fiber link exists between the second RRU and the first RRU, or that the optical fiber link between the second RRU and the first RRU is abnormal; and sending the third information to the first RRU by using the PLC module in the second RRU.

In this implementation, when the second RRU cannot send the third information to the first RRU by using the optical fiber, the second RRU may send the third information to the first RRU by using the PLC module in the second RRU, leading to high reliability of sending the third information to the first RRU.

In a possible implementation, the first RRU in the dormant state meets at least one of the following conditions: a laser of an optical module connected to the first RRU is in an off state, a power supply status of an optical module connected to the first RRU is unpowered, or a circuit between the first RRU and an optical module connected to the first RRU is in a disabled state.

In this implementation, when the first RRU meets the foregoing condition, the first RRU is in the deep dormant state, thereby reducing power consumption.

In a possible implementation, the optical module connected to the first RRU includes at least one of the following: an optical module disposed in the first RRU, an optical module disposed in the BBU and configured to communicate with the first RRU, an optical module disposed in a cascaded RRU of the first RRU, or an optical module disposed in a front RRU of the first RRU and connected to the first RRU.

According to a sixth aspect, an embodiment of this application provides a communication method, applied to a first RRU. The method includes: determining to enter a dormant state; receiving third information from a second RRU by using a PLC module in the first RRU; and determining to exit the dormant state, where the first RRU is connected to the second RRU through a power line, and a PLC module is disposed in the second RRU.

In the foregoing process, the first RRU may enter a deep dormant state according to an actual requirement, to reduce power consumption. When a BBU needs the first RRU to exit the dormant state, the BBU may send the third information (the third information indicates the first RRU to exit the current dormant state) to the second RRU by using an optical fiber. The second RRU may send the third information to the first RRU by using a power line, to enable the first RRU to exit the dormant state. In the foregoing process, the first RRU may enter the deep dormant state, so that an interface in the RRU and the BBU is in an off state, thereby reducing power consumption.

In a possible implementation, the entering a dormant state includes at least one of the following: turning off a laser of an optical module connected to the first RRU, stopping supplying power to an optical module connected to the first RRU, or disabling a circuit between the first RRU and an optical module connected to the first RRU.

In this implementation, after the first RRU enters the dormant state according to the foregoing method, the interface in the first RRU and the BBU may be in the off state, thereby further reducing power consumption.

In a possible implementation, the first RRU in the dormant state meets at least one of the following conditions: the laser of the optical module connected to the first RRU is in an off state, a power supply status of the optical module connected to the first RRU is unpowered, or the circuit between the first RRU and the optical module connected to the first RRU is in a disabled state.

In this implementation, after the first RRU enters the dormant state according to the foregoing method, the interface in the first RRU and the BBU may be in the off state, thereby further reducing power consumption.

In a possible implementation, the optical module connected to the first RRU includes at least one of the following: an optical module disposed in the first RRU, an optical module disposed in the BBU and configured to communicate with the first RRU, an optical module disposed in a cascaded RRU of the first RRU, or an optical module disposed in a front RRU of the first RRU and connected to the first RRU.

According to a seventh aspect, an embodiment of this application provides a communication apparatus, including at least one processor and an interface circuit, where the interface circuit is configured to receive a signal from a communication apparatus other than the communication apparatus and transmit the signal to the processor, or send a signal from the processor to a communication apparatus other than the communication apparatus, and the processor is configured to implement the method according to the first aspect by using a logic circuit or by executing code instructions.

According to an eighth aspect, an embodiment of this application provides a communication apparatus, including at least one processor and an interface circuit, where the interface circuit is configured to receive a signal from a communication apparatus other than the communication apparatus and transmit the signal to the processor, or send a signal from the processor to a communication apparatus other than the communication apparatus, and the processor is configured to implement the method according to the second aspect by using a logic circuit or by executing code instructions.

According to a ninth aspect, an embodiment of this application provides a communication apparatus, including at least one processor and an interface circuit, where the interface circuit is configured to receive a signal from a communication apparatus other than the communication apparatus and transmit the signal to the processor, or send a signal from the processor to a communication apparatus other than the communication apparatus, and the processor is configured to implement the method according to the third aspect by using a logic circuit or by executing code instructions.

According to a tenth aspect, an embodiment of this application provides a communication apparatus, including at least one processor and an interface circuit, where the interface circuit is configured to receive a signal from a communication apparatus other than the communication apparatus and transmit the signal to the processor, or send a signal from the processor to a communication apparatus other than the communication apparatus, and the processor is configured to implement the method according to the fourth aspect by using a logic circuit or by executing code instructions.

According to an eleventh aspect, an embodiment of this application provides a communication apparatus, including at least one processor and an interface circuit, where the interface circuit is configured to receive a signal from a communication apparatus other than the communication apparatus and transmit the signal to the processor, or send a signal from the processor to a communication apparatus other than the communication apparatus, and the processor is configured to implement the method according to the fifth aspect by using a logic circuit or by executing code instructions.

According to a twelfth aspect, an embodiment of this application provides a communication apparatus, including at least one processor and an interface circuit, where the interface circuit is configured to receive a signal from a communication apparatus other than the communication apparatus and transmit the signal to the processor, or send a signal from the processor to a communication apparatus other than the communication apparatus, and the processor is configured to implement the method according to the sixth aspect by using a logic circuit or by executing code instructions.

According to a thirteenth aspect, an embodiment of this application provides a communication apparatus. The communication apparatus includes at least one processor and a memory, where the processor is coupled to the memory, the memory includes a computer program, and the computer program is executed in the at least one processor, to implement a function of the first RRU in the method according to the first aspect.

According to a fourteenth aspect, an embodiment of this application provides a communication apparatus. The communication apparatus includes at least one processor and a memory, where the processor is coupled to the memory, the memory includes a computer program, and the computer program is executed in the at least one processor, to implement a function of the second RRU in the method according to the second aspect.

According to a fifteenth aspect, an embodiment of this application provides a communication apparatus. The communication apparatus includes at least one processor and a memory, where the processor is coupled to the memory, the memory includes a computer program, and the computer program is executed in the at least one processor, to implement a function of the BBU in the method according to the third aspect.

According to a sixteenth aspect, an embodiment of this application provides a communication apparatus. The communication apparatus includes at least one processor and a memory, where the processor is coupled to the memory, the memory includes a computer program, and the computer program is executed in the at least one processor, to implement a function of the BBU in the method according to the fourth aspect.

According to a seventeenth aspect, an embodiment of this application provides a communication apparatus. The communication apparatus includes at least one processor and a memory, where the processor is coupled to the memory, the memory includes a computer program, and the computer program is executed in the at least one processor, to implement a function of the second RRU in the method according to the fifth aspect.

According to an eighteenth aspect, an embodiment of this application provides a communication apparatus. The communication apparatus includes at least one processor and a memory, where the processor is coupled to the memory, the memory includes a computer program, and the computer program is executed in the at least one processor, to implement a function of the first RRU in the method according to the sixth aspect.

According to a nineteenth aspect, an embodiment of this application provides a communication system, including, for example, the communication apparatus according to the seventh aspect, the communication apparatus according to the eighth aspect, and the communication apparatus according to the ninth aspect.

According to a twentieth aspect, an embodiment of this application provides a communication system, including, for example, the communication apparatus according to the tenth aspect, the communication apparatus according to the eleventh aspect, and the communication apparatus according to the twelfth aspect.

According to a twenty-first aspect, an embodiment of this application provides a communication apparatus. The apparatus is configured to perform the method according to any one of the first aspect to the sixth aspect.

According to a twenty-second aspect, an embodiment of this application provides a computer-readable storage medium, where the computer-readable storage medium stores a computer program or instructions. When the computer program or the instructions are executed by a communication apparatus, the method according to any one of the first aspect to the sixth aspect is implemented.

According to a twenty-third aspect, an embodiment of this application provides a computer program product, including a computer program. When the computer program is run on a computer device, the computer device is enabled to perform the method according to any one of the first aspect to the sixth aspect.

In the communication method, apparatus, and system provided in embodiments of this application, a PLC module is disposed in an RRU, and different RRUs are connected by using a power line, so that PLC may be performed between different RRUs by using PLC modules. In this way, after the link between the BBU and the first RRU is faulty, the first RRU may send the information about the first RRU and/or the information about the optical module connected to the first RRU to the BBU by using the at least one second RRU, so that the BBU may determine the fault information of the link in time, to fast locate a link fault. In addition, the faulty link may be maintained in time, thereby improving efficiency of maintaining the base station.

DESCRIPTION OF EMBODIMENTS

Figure 1A:
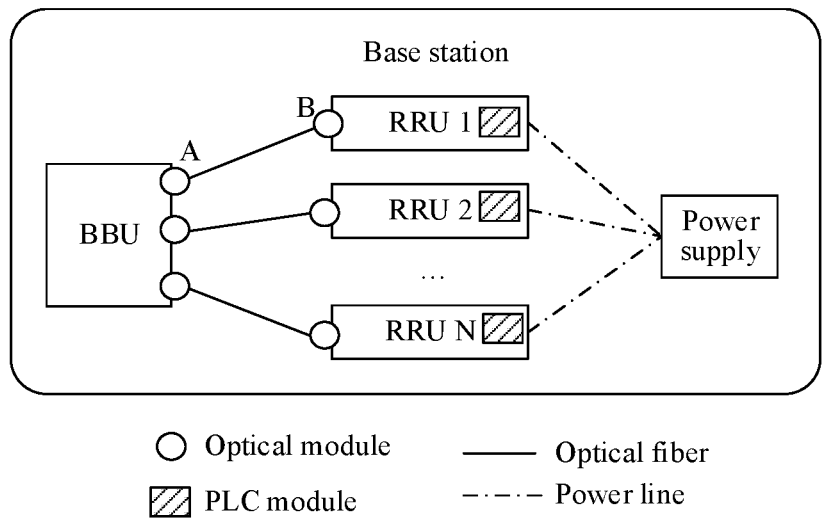
FIG. 1A is a diagram of an architecture of abase station according to an embodiment of this application.

For ease of understanding, concepts in embodiments of this application are first described.

Base station: The base station may usually include a baseband unit (BBU) and at least one remote radio unit (RRU), and the BBU and the at least one RRU may be connected through an optical fiber.

RRU: The RRU may perform intermediate frequency processing, radio frequency processing, and duplexing on a signal. The intermediate frequency processing may include digital in-phase/quadrature (I/Q) modulation and demodulation, up- and down-conversion, and digital to analog (DA)/analog to digital (AD) conversion. The RRU may also be referred to as an RFU. Optionally, an antenna may further be integrated in the RRU. In this case, the RRU may also be referred to as an active antenna unit (AAU). For ease of description, the following uses the RRU as an example for description, that is, the RRU shown below may alternatively be the RFU or the AAU.

BBU: The BBU may perform baseband processing on a signal, and may further provide a transmission interface, a radio resource, clock information, and the like for the RRU. The baseband processing may include channel encoding/decoding processing and modulation/demodulation processing.

Optical module: The optical module is configured to perform optical-to-electrical conversion and electrical-to-optical conversion. The optical module may be inserted in a device (for example, the RRU or the BBU), and perform optical-to-electrical conversion and electrical-to-optical conversion on a signal transmitted between devices. For example, when a device sends an electrical signal, an optical module inserted in the device may convert the electrical signal into an optical signal for sending. After receiving an optical signal, the optical module inserted in the device may convert the optical signal into an electrical signal for receiving.

Power line communication (PLC): Data (service data or signaling) is transmitted by using a power line. Through a PLC technology, a data transmitting end may load a high frequency signal that carries data information to a current and transmit the high frequency signal by using a power line, and an adapter of a data receiving end may separate the high frequency signal from the current, to obtain the data information carried in the high frequency signal.

PLC module: The PLC module may provide a PLC function. After a PLC module is disposed in a device, the device may perform power line communication with another device by using the PLC module.

In this application, an optical fiber communication link is used as an example of a communication link between the BBU and the RRU, that is, the communication link includes an optical fiber and an optical module. Certainly, the communication link between the BBU and the RRU may also be another type of communication link. This is not limited in this application.

In embodiments of this application, a PLC module is disposed in an RRU, and different RRUs are connected by using a power line, so that PLC may be performed between different RRUs in a base station by using PLC modules. In this way, after a link between a BBU and an RRU is faulty, the RRU may still communicate with the BBU through another RRU, so that the BBU may determine fault information of the link in time, thereby maintaining the faulty link in time, and improving efficiency of maintaining a base station.

For ease of understanding, the following describes an architecture of the base station with reference to FIG. 1A to FIG. 1F.

FIG. 1A is a diagram of an architecture of a base station according to an embodiment of this application. Refer to FIG. 1A. The base station includes a BBU, N RRUs, and a power supply, where N is an integer greater than or equal to 1. N optical modules are disposed in the BBU, and one optical module is disposed in each of the N RRUs. The optical module may be disposed in the BBU or the RRU through insertion. The RRU is connected to the BBU by using an optical fiber, and two ends of the optical fiber are respectively connected to the optical modules disposed in the BBU and the RRU. In this way, communication between the RRU and the BBU may be implemented by using the optical fiber. A PLC module is disposed in each of the N RRUs. The power supply is connected to the N RRUs by using a power line. The power supply may supply power to the N RRUs by using the power line, and PLC may be performed between different RRUs by using the power line and the PLC modules.

In an actual communication process, an optical module may convert an electrical signal to be sent by a device (the RRU or the BBU) into an optical signal, and transmit the optical signal to a device (the BBU or the RRU) at another end by using the optical fiber. An optical module in the device at another end may convert the received optical signal into an electrical signal for subsequent processing. For example, in a process in which the BBU sends a signal to an RRU 1, an optical module A in the BBU converts an electrical signal to be sent by the BBU into an optical signal, and sends the optical signal by using an optical fiber. After the optical signal reaches an optical module B, the optical module B converts the optical signal into an electrical signal, and transmits the electrical signal to the RRU 1 for subsequent processing.

Figure 1B:
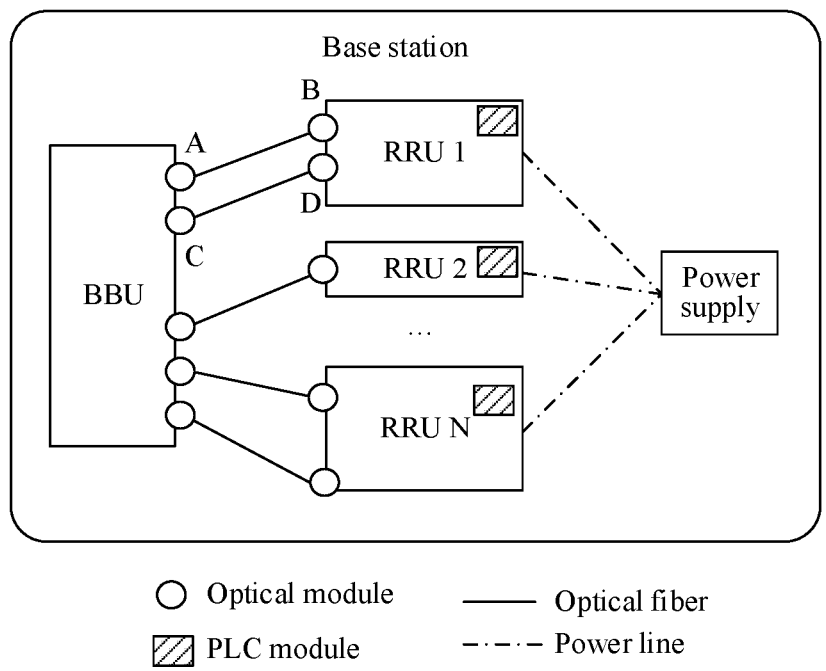
FIG. 1B is a diagram of an architecture of another base station according to an embodiment of this application.

FIG. 1B is a diagram of an architecture of another base station according to an embodiment of this application. Refer to FIG. 1B. The base station includes a BBU, N RRUs, and a power supply, where N is an integer greater than or equal to 1. A plurality of (greater than N) optical modules are disposed in the BBU, and at least one optical module is disposed in each RRU. For example, two optical modules are disposed in an RRU 1, one optical module is disposed in an RRU 2, and two optical modules are disposed in an RRU N. The optical module may be disposed in the BBU or the RRU through insertion. A quantity of optical modules disposed in the BBU may be a sum of quantities of optical modules disposed in the N RRUs. The RRU is connected to the BBU by using at least one optical fiber, and two ends of the optical fiber are respectively connected to the optical modules disposed in the BBU and the RRU. For example, if two optical modules are disposed in the RRU 1, the RRU is separately connected to the BBU by using two optical fibers, and two ends of each optical fiber are respectively connected to the optical module in the BBU and the optical module in the RRU. Different optical fibers are connected to different optical modules. Certainly, a quantity of optical modules disposed in the RRU may alternatively be three, four, or the like. This is not limited to some embodiments. A PLC module is disposed in each of the N RRUs. The power supply is connected to the N RRUs by using a power line. The power supply may supply power to each RRU by using the power line. PLC may be performed between different RRUs by using the power line and the PLC modules. In FIG. 1B, a plurality of optical modules are disposed in the RRU, so that a communication capacity between the BBU and the RRU may be improved.

Figure 1C:
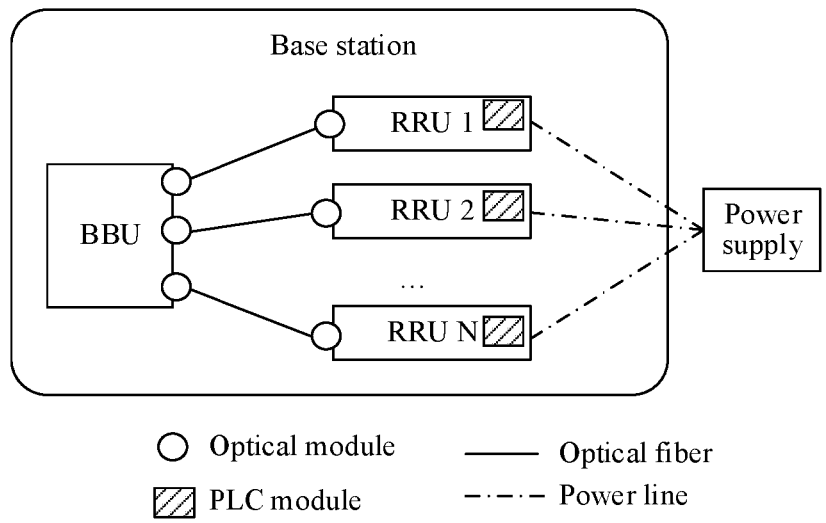
FIG. 1C is a diagram of an architecture of still another base station according to an embodiment of this application.

FIG. 1C is a diagram of an architecture of still another base station according to an embodiment of this application. Based on FIG. 1A, refer to FIG. 1C. The power supply may alternatively be disposed outside the base station, that is, the base station does not include the power supply. Certainly, in the base station shown in any other figure, the power supply may be disposed outside the base station. Details are not described for this embodiment.

Notably, communication processes of the base station shown in FIG. 1B and FIG. 1C are similar to a communication process of the base station shown in FIG. 1A. Details are not described herein again.

Figure 1D:
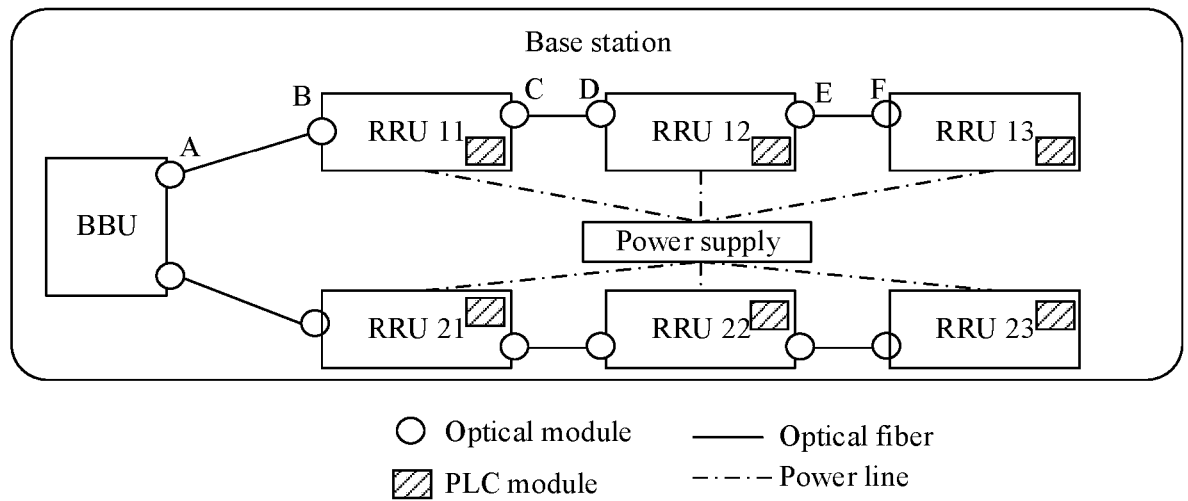
FIG. 1D is a diagram of an architecture of yet another base station according to an embodiment of this application.

FIG. 1D is a diagram of an architecture of yet another base station according to an embodiment of this application. Refer to FIG. 1D. The base station includes a BBU, a plurality of RRUs, and a power supply. An RRU directly connected to the BBU may be defined as a directly connected RRU, and an RRU indirectly connected to the BBU may be defined as a cascaded RRU. For example, an RRU 11 and an RRU 21 are directly connected RRUs, and an RRU 12, an RRU 13, an RRU 22, and an RRU 23 are cascaded RRUs. At least one optical module is disposed in each of the RRU and the BBU. For example, two optical modules are disposed in each of the BBU, the RRU 11, the RRU 12, the RRU 21, and the RRU 22, and one optical module is disposed in each of the RRU 13 and the RRU 23. One end of the directly connected RRU is connected to the BBU by using an optical fiber, and the other end is connected to at least one cascaded RRU by using an optical fiber. Neighboring cascaded RRUs are connected by using an optical fiber. Two ends of each optical fiber are respectively connected to optical modules. A PLC module is disposed in each of the plurality of RRUs. The power supply is connected to the plurality of RRUs by using a power line. The power supply may supply power to the plurality of RRUs by using the power line. PLC may be performed between different RRUs by using the power line and the PLC modules.

In an actual communication process, a message sent by the BBU to the cascaded RRU needs to be forwarded by the directly connected RRU. For example, when the BBU sends a message to the RRU 12, the message needs to be forwarded by the RRU 11. For example, when the BBU sends a message to the RRU 13, the message needs to be forwarded by the RRU 11 and the RRU 12.

Figure 1E:
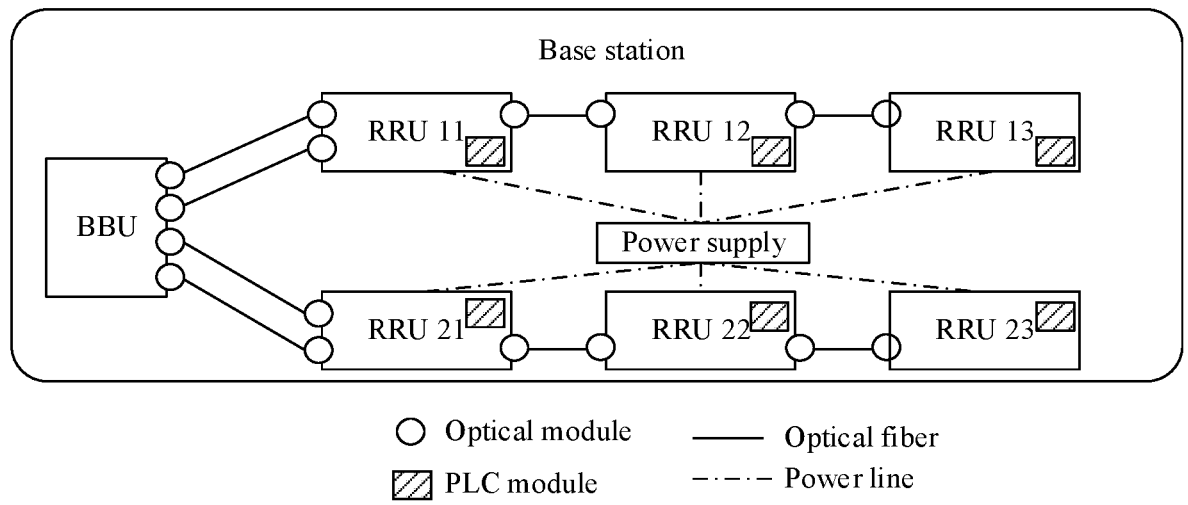
FIG. 1E is a diagram of an architecture of another base station according to an embodiment of this application.

FIG. 1E is a diagram of an architecture of another base station according to an embodiment of this application. Refer to FIG. 1E. Based on FIG. 1D, a directly connected RRU is connected to the BBU by using a plurality of optical fibers (two optical fibers are used as an example in FIG. 1E for description). In this way, a communication capacity between the BBU and the RRU may be improved. For a structural description and communication process of the base station shown in FIG. 1E, refer to FIG. 1B and FIG. 1D. Details are not described herein again.

Figure 1F:
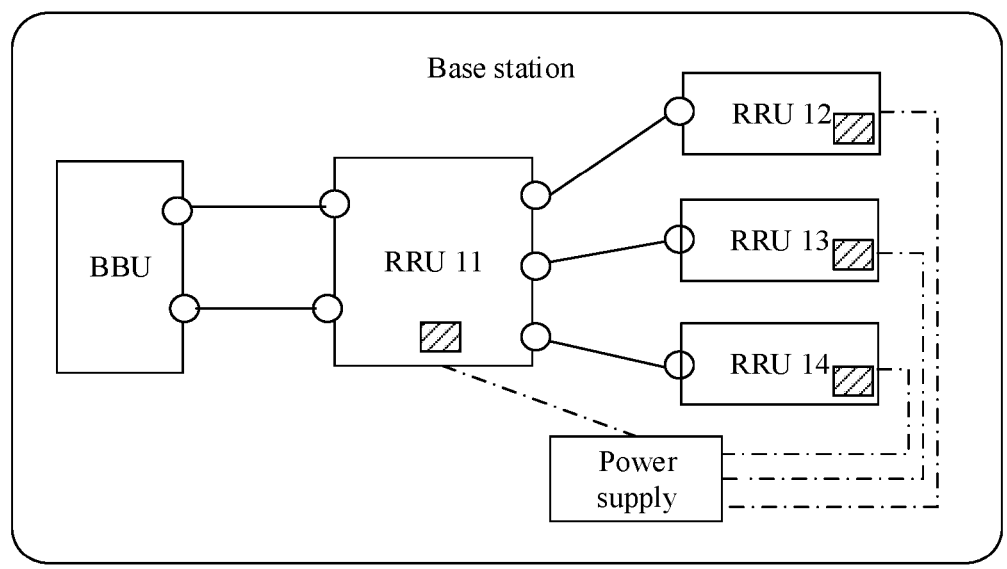
FIG. 1F is a diagram of an architecture of still another base station according to an embodiment of this application.

FIG. 1F is a diagram of an architecture of still another base station according to an embodiment of this application. Refer to FIG. 1F. The base station includes a BBU, a plurality of RRUs, and a power supply. The plurality of RRUs include a directly connected RRU 11, a cascaded RRU 12, a cascaded RRU 13, and a cascaded RRU 14. One end of the directly connected RRU 11 is connected to the BBU by using an optical fiber, and the other end is connected to the three cascaded RRUs through the optical fiber. The directly connected RRU 11 may forward a message sent by the BBU to the cascaded RRU. PLC modules are disposed in the plurality of RRUs. The power supply is connected to the plurality of RRUs by using a power line. The power supply may supply power to the plurality of RRUs by using the power line. PLC may be performed between different RRUs by using the power line and the PLC modules.

Optionally, in FIG. 1A to FIG. 1F, a PLC module may be disposed in some RRUs, and may not be disposed in some RRUs.

Notably, FIG. 1A to FIG. 1F are merely examples of several possible diagrams of the architectures of the base station, and are not intended to limit the architecture of the base station. Certainly, in the base station shown in FIG. 1A to FIG. 1F, a quantity of RRUs, a quantity of optical modules, a location of the power supply, and the like may alternatively be set according to an actual requirement. This is not limited in embodiments of this application.

The following describes in detail the technical solutions in this application by using specific embodiments. Notably, the following several embodiments may exist independently or may be combined with each other, and same or similar content is not repeatedly described in different embodiments.

Figure 2:
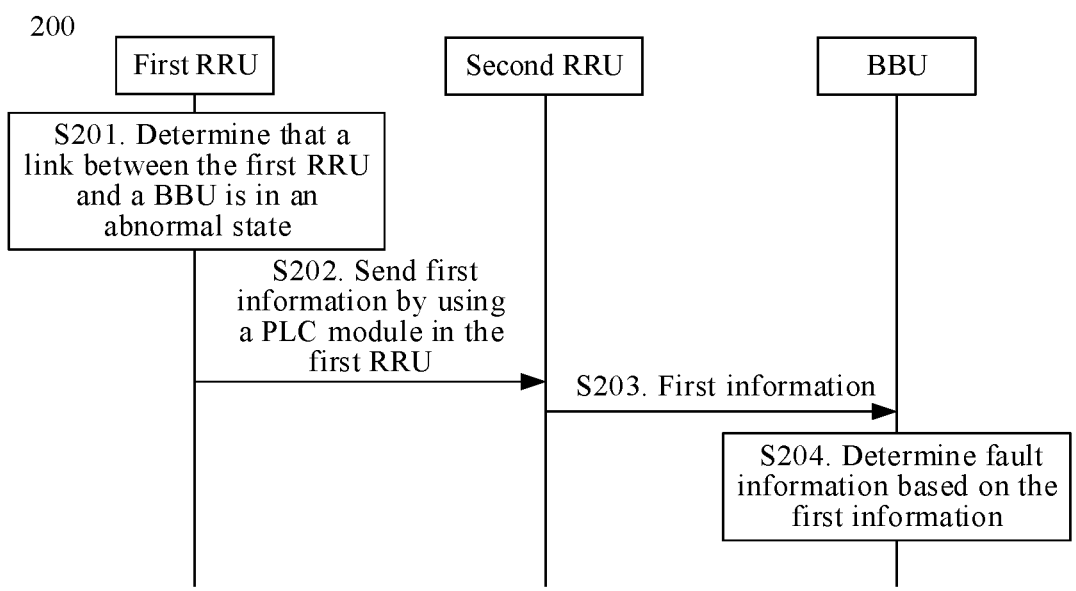
FIG. 2 is a schematic flowchart of a communication method according to an embodiment of this application.

FIG. 2 is a schematic flowchart of a communication method according to an embodiment of this application. Refer to FIG. 2. The method 200 may include the following steps.

S201. A first RRU determines that a link between the first RRU and a BBU is in an abnormal state.

A base station includes the BBU and a plurality of RRUs, and the first RRU is any one of the plurality of RRUs. For example, an architecture of the base station may be any one of the architectures in FIG. 1A to FIG. 1F.

The first RRU may detect the link between the first RRU and the BBU in real time or periodically, to determine whether the link between the first RRU and the BBU is in a normal state or the abnormal state. If the link is in the abnormal state, it may be considered that the link is faulty.

In any one or more of the following cases, the link between the first RRU and the BBU is in the abnormal state:

Case 1: The first RRU is faulty.

A fault in the first RRU may include: a software fault and/or a hardware fault.

Case 2: An optical module connected to the first RRU is faulty.

The optical module connected to the first RRU may include an optical module for communication between the first RRU and the BBU, that is, an optical module through which data transmitted between the first RRU and the BBU passes.

When the architecture of the base station is different, the optical module connected to the first RRU may be different.

When the first RRU is directly connected to the BBU, (communication between the first RRU and the BBU does not need to be relayed by another RRU), the optical module connected to the first RRU may include at least one of the following: an optical module disposed in the first RRU and configured to communicate with the BBU, or an optical module disposed in the BBU and configured to communicate with the first RRU. For example, refer to FIG. 1A. An optical module connected to the RRU 1 may include at least one of the optical module A or the optical module B. To be specific, if any one or more of the optical module A or the optical module B is faulty, a link between the RRU 1 and the BBU may be in the abnormal state. For another example, refer to FIG. 1B. An optical module connected to the RRU 1 may include at least one of an optical module A, an optical module B, an optical module C, or an optical module D. To be specific, if any one or more of the optical module A, the optical module B, the optical module C, or the optical module D is faulty, at least one link between the RRU 1 and the BBU may be in the abnormal state. For still another example, refer to FIG. 1D. An optical module connected to an RRU 1 may include at least one of an optical module A or an optical module B. To be specific, if any one or more of the optical module A or the optical module B is faulty, a link between the RRU 1 and the BBU may be in the abnormal state.

When the first RRU is not directly connected to the BBU (communication between the first RRU and the BBU needs to be relayed by another RRU), the optical module connected to the first RRU may include at least one of the following: an optical module disposed in the first RRU and configured to communicate with the BBU, an optical module disposed in the BBU and configured to communicate with the first RRU, or an optical module disposed in an intermediate RRU. The intermediate RRU may be an RRU configured to forward data between the BBU and the first RRU. For example, refer to FIG. 1D. The RRU 11 is an intermediate RRU of the RRU 12, and the RRU 11 and the RRU 12 are intermediate RRUs of the RRU 13. For example, refer to FIG. 1D. An optical module connected to the RRU 12 may include at least one of an optical module A, an optical module B, an optical module C, or an optical module D. To be specific, if any one or more of the optical module A, the optical module B, the optical module C, or the optical module D is faulty, at least one link between the RRU 12 and the BBU may be in the abnormal state. For example, an optical module connected to the RRU 13 may include at least one of an optical module A, an optical module B, an optical module C, an optical module D, an optical module E, or an optical module F. To be specific, if any one or more of the optical module A, the optical module B, the optical module C, the optical module D, the optical module E, or the optical module F is faulty, at least one link between the RRU 13 and the BBU may be in the abnormal state.

Case 3: An optical fiber between the first RRU and the BBU is faulty.

The optical fiber between the first RRU and the BBU includes an optical fiber for communication between the first RRU and the BBU, that is, an optical fiber through which data transmitted between the first RRU and the BBU passes.

For example, refer to FIG. 1A. An optical fiber between the RRU 1 and the BBU includes an optical fiber between the optical module A and the optical module B. For example, refer to FIG. 1B. An optical fiber between the RRU 1 and the BBU includes an optical fiber between the optical module A and the optical module B, and an optical fiber between the optical module C and the optical module D. For example, refer to FIG. 1D. An optical fiber between the RRU 12 and the BBU includes an optical fiber between the optical module A and the optical module B, and an optical fiber between the optical module C and the optical module D.

The first RRU may determine, in the following manner, whether the link between the first RRU and the BBU is in the abnormal state:

The first RRU determines whether there is a heartbeat packet from the BBU received within first duration. If there is a heartbeat packet from the BBU is received within the first duration, the first RRU determines that the link between the first RRU and the BBU is in the normal state. If there is no heartbeat packet from the BBU received within the first duration, the first RRU determines that the link between the first RRU and the BBU is in the normal state. A start moment of the first duration is a moment at which the first RRU receives a heartbeat packet from the BBU last time. For example, after the first RRU receives a heartbeat packet from the BBU, if the first RRU receives a heartbeat packet from the BBU within the first duration, the first RRU determines that the link between the first RRU and the BBU is in the normal state; and if no heartbeat packet is received from the BBU within the first duration, the first RRU determines that the link between the first RRU and the BBU is in the abnormal state.

S202. The first RRU sends first information to at least one second RRU by using a PLC module in the first RRU.

The first RRU is connected to the at least one second RRU by using a power line. A PLC module is disposed in each of the first RRU and the at least one second RRU. The second RRU and the first RRU may be located in the same base station.

The first RRU may send the first information to the power line by using the PLC module in the first RRU, and the second RRU may receive the first information from the power line by using the PLC module in the second RRU.

The first RRU may send the first information to the at least one second RRU in the following manner:

In a feasible implementation, the first RRU broadcasts the first information on the power line by using the PLC module in the first RRU.

Because the first RRU and each second RRU are interconnected by using the power line, after the first RRU broadcasts the first information on the power line by using the PLC module, each second RRU may receive the first information.

In this feasible implementation, RRUs communicate with each other in a broadcast manner, and a relay device does not need to be added to an existing power supply system (including a power supply and the power line). This has high feasibility.

In another feasible implementation, the first RRU sends the first information to a relay device by using the PLC module in the first RRU, and the relay device sends the first information to the at least one second RRU.

The relay device may be disposed in or outside a power supply. The relay device is connected to each RRU by using the power line.

The first information sent by the first RRU to the relay device may carry address information of the at least one second RRU, so that the relay device may forward the first information to the at least one second RRU based on the address information of the at least one second RRU. Optionally, the address information of the second RRU may be a high-level data link control (HDLC) address, an Internet protocol (IP) address, a media access control (MAC) address, a hop number, and the like of the second RRU.

In this feasible implementation, the first information may be selectively sent to some second RRUs, and signaling overheads may be flexibly controlled.

The first information includes information about the first RRU and/or information about the optical module connected to the first RRU.

Optionally, the information about the first RRU includes at least one of the following information:

Information 1: Identifier of the first RRU.

The identifier of the first RRU may include at least one of the following: an address of the first RRU, a sequence number of the first RRU, or the like.

Information 2: Information about a radio frequency module of the first RRU.

The information about the radio frequency module of the first RRU may include at least one of the following: software fault information or hardware fault information of the first RRU. For example, the software fault information is software alarm information, and the hardware fault information is hardware alarm information.

Information 3: Bit error rate of the communication link between the first RRU and the BBU.

The bit error rate of the communication link may be a bit error rate of data transmitted through the communication link. The first RRU may perform statistical analysis on received data, to determine a bit error rate of the communication link.

Information 4: Running duration of the first RRU.

The running duration of the first RRU may be duration in which the first RRU runs after the first RRU is powered on last time.

Information 5: Quantity of reset times of the first RRU in a first time period.

The first time period may be a period of time before a current moment. For example, the first time period may be one day before the current moment, or one hour before the current moment. For another example, the first time period may be a time period between a moment at which the first RRU is powered on and the current moment.

Notably, the foregoing merely illustrates content included in the information about the first RRU by example, and does not limit the content included in the information about the first RRU. The information about the first RRU may further include other information. For example, the information about the first RRU may further include device information (for example, a manufacturer or a model) of the first RRU and a deployment location of the first RRU.

For an explanation of the optical module connected to the first RRU, refer to the description in case 2 in S201. Details are not described herein again. The information about the optical module connected to the first RRU may include at least one of the following information:

Information 1: Identifier of the optical module connected to the first RRU.

Information 2: Optical power of the optical module connected to the first RRU.

The optical power of the optical module may include at least one of the following: optical transmit power or optical receive power of the optical module.

Information 3: Bias current of the optical module connected to the first RRU.

Information 4: Device information of the optical module connected to the first RRU.

The device information of the optical module may include at least one of the following: information such as a manufacturer, a model, or an installation time of the optical module.

Information 5: Fault information of the optical module connected to the first RRU.

The fault information of the optical module connected to the first RRU may include at least one of the following: abnormal receiving by the optical module, abnormal sending by the optical module, a hardware fault in the optical module, or abnormal running of the optical module.

Optionally, the first RRU may actively send the first information to the second RRU, or may send the first information to the second RRU after receiving a request message. The following two cases may be included:

Case 1: The first RRU actively sends the first information to the second RRU.

When the first RRU determines that the link between the first RRU and the BBU is in the abnormal state, the first RRU actively sends the first information to the at least one second RRU, to cause the second RRU to send the first information to the BBU. In this way, the BBU may determine in time that the link between the first RRU and the BBU is abnormal.

Case 2: After receiving the request message, the first RRU sends the first information to the second RRU.

The BBU may send a request message to the first RRU periodically, at a predetermined time point, or when finding that a link between the BBU and the first RRU is faulty, to request to obtain the first information. After receiving the request message, the first RRU sends the first information to the BBU via the second RRU.

For example, the BBU may send a request message to a plurality of RRUs. After an RRU receives the request message, the RRU may broadcast the request message to another RRU by using the PLC module, so that all RRUs may receive the request message. The request message may carry an identifier of the RRU 1, so that only the RRU 1 needs to parse the received request message.

Optionally, to improve reliability of obtaining the first information by the BBU, the first RRU may send the first information in both of the manners described in the foregoing two cases. That is, the first RRU may actively send the first information to the second RRU. To avoid missing receiving of the first information, the BBU may further actively request the first information from the RRU. In this case, if the BBU obtains repeated first information, the BBU may discard the repeated first information.

S203. The second RRU sends the first information to the BBU.

The second RRU may send the first information to the BBU by using the optical fiber.

The second RRU in S203 may represent all second RRUs that receive the first information, or may be some second RRUs that receive the first information. The following separately describes the two cases.

Case 1: The second RRU in S203 is all second RRUs that receive the first information.

In this case, all second RRUs that receive the first information send the first information to the BBU. In this way, a probability of receiving the first information by the BBU may be increased.

Case 2: The second RRU in S203 is some second RRUs that receive the first information.

The some second RRUs may be assistant RRUs of the first RRU. The assistant RRU of the first RRU is configured to forward the first information of the first RRU to the BBU. That is, when the link between the first RRU and the BBU is in the abnormal state, the assistant RRU of the first RRU forwards the first information of the first RRU to the BBU, so that the BBU learns of fault information of the first RRU.

When two RRUs are not cascaded, for example, two RRUs are not interconnected through an optical fiber, a topology relationship between the two RRUs may be referred to as a parallel connection relationship. Preferably, the assistant RRU of the first RRU and the first RRU are in a parallel connection relationship. In this way, a probability that a link between the RRU and the BBU and a link between the assistant RRU and the BBU are faulty at the same time may be reduced. For example, refer to FIG. 1A to FIG. 1C. The RRUs in the base station are in a parallel connection relationship. Refer to FIG. 1D and FIG. 1E. The RRU 11, the RRU 12, and the RRU 13 are in a serial connection relationship, and the RRU 21, the RRU 22, and the RRU 23 are in a serial connection relationship. Any one of the RRU 11, the RRU 12, and the RRU 13 is in a parallel connection relationship with any one of the RRU 21, the RRU 22, and the RRU 23. For example, refer to FIG. 1A to FIG. 1C. An assistant RRU of the RRU 1 may be any one or more other RRUs in the base station than the RRU 1. Refer to FIG. 1D and FIG. 1E. An assistant RRU of the RRU 11 may usually be one or more of the RRU 21, the RRU 22, or the RRU 23.

For any second RRU that receives the first information, the second RRU determines whether the second RRU is an assistant RRU of the first RRU, and sends the first information to the BBU only when the second RRU determines that the second RRU is an assistant RRU of the first RRU. If the second RRU determines that the second RRU is not an assistant RRU of the first RRU, the second RRU does not send the first information to the BBU, and may discard the first information.

The second RRU may determine, in the following manner, whether the second RRU is the assistant RRU of the first RRU:

The second RRU obtains second information, where the second information includes an identifier of an RRU that requires assistance from the second RRU. If the second information includes the identifier of the first RRU, the second information determines that the second RRU is the assistant RRU of the first RRU.

The second RRU may obtain the second information in the following manners:

Manner 1: The second RRU may receive the second information from the BBU.

The BBU may determine the assistant RRU of the first RRU, and then generate the second information based on the assistant RRU of the first RRU.

Optionally, the second information includes two fields. One field is the identifier of the first RRU, and the other field is an identifier of the assistant RRU of the first RRU. Correspondingly, the BBU may generate the second information based on the identifier of the first RRU and the identifier of the assistant RRU of the first RRU. An identifier of an RRU may be address information of the RRU.

For example, assuming that the identifier of the first RRU is RRU1, and identifiers of assistant RRUs of the first RRU are RRU2 and RRU3, the second information may include <RRU1><RRU2, RRU3>.

The BBU may determine that the second RRU is the assistant RRU of the first RRU, and then generate the second information based on the second RRU. The BBU sends the second information to the second RRU. Optionally, after the BBU generates the second information, the BBU may send the second information to all RRUs served by the BBU.

Manner 2: The second RRU may receive the second information from the first RRU.

Optionally, the BBU may determine the assistant RRU of the first RRU, generate the second information based on the assistant RRU of the first RRU, and send the second information to the first RRU. After receiving the second information, the first RRU may send the second information to the second RRU. For example, the first RRU may broadcast the second information.

Optionally, the first RRU may determine the second information, and send the second information to the second RRU. For example, the first RRU may broadcast the second information.

Manner 3: The second RRU may obtain the second information from preset storage space.

The second information may be preconfigured in the preset storage space. When the second RRU needs to determine whether the second RRU is the assistant RRU of the first RRU, the second RRU obtains the second information from the preset storage space.

For example, the second RRU may receive the second information from the BBU or the first RRU in advance, and store the second information in the preset storage space, or configure the second information in storage space of the second RRU when the second RRU is delivered from a factory. When the second RRU needs to use the second information, the second RRU obtains the second information from the preset storage space.

S204. The BBU determines fault information based on the first information.

Optionally, the fault information includes at least one of the following information:

Information 1: The first RRU is faulty.

Software in the first RRU is faulty or hardware in the first RRU is faulty.

Information 2: The optical module connected to the first RRU is faulty.

For an explanation of the optical module connected to the first RRU, refer to the description in case 2 in S201. Details are not described herein again. That the optical module is faulty may include at least one of the following: the optical power of the optical module is abnormal or the bias current of the optical module is abnormal.

Information 3: The optical fiber between the first RRU and the BBU is faulty.

When a communication link between an RRU and the BBU is faulty, a communication link between a cascaded RRU of the RRU and the BBU is usually also faulty. For example, refer to FIG. 1D. If a link between the RRU 11 and the BBU is faulty, a link between the RRU 12 and the BBU and a link between the RRU 13 and the BBU are also faulty. Alternatively, if a link between the RRU 12 and the BBU is faulty, a link between the RRU 13 and the BBU is also faulty.

For example, assuming that the first information includes the software fault information of the first RRU, the BBU may determine that the software in the first RRU is faulty.

For example, assuming that the first information includes the identifier of the first RRU and an identifier of an optical module 1, the BBU may determine, based on the first information, that the optical module 1 in the first RRU is faulty.

For example, assuming that the first information includes the identifier of the first RRU and the optical power of an optical module 1, the BBU may determine, based on the first information, that the optical power of the optical module 1 in the first RRU is abnormal.

For example, assuming that the BBU determines, based on the first information, that the optical module connected to the first RRU is not faulty, and the first RRU is not faulty, the BBU may determine that the optical fiber between the first RRU and the BBU is faulty.

In the communication method provided in some embodiments, a PLC module is disposed in an RRU, and different RRUs are connected by using a power line, so that PLC may be performed between different RRUs in the base station by using PLC modules. In this way, after the link between the BBU and the first RRU is faulty, the first RRU may send the information about the first RRU and/or the information about the optical module connected to the first RRU to the BBU by using the at least one second RRU, so that the BBU may determine fault information of the link in time, to fast locate a link fault. In addition, the faulty link may be maintained in time, thereby improving efficiency of maintaining the base station.

Figure 3:
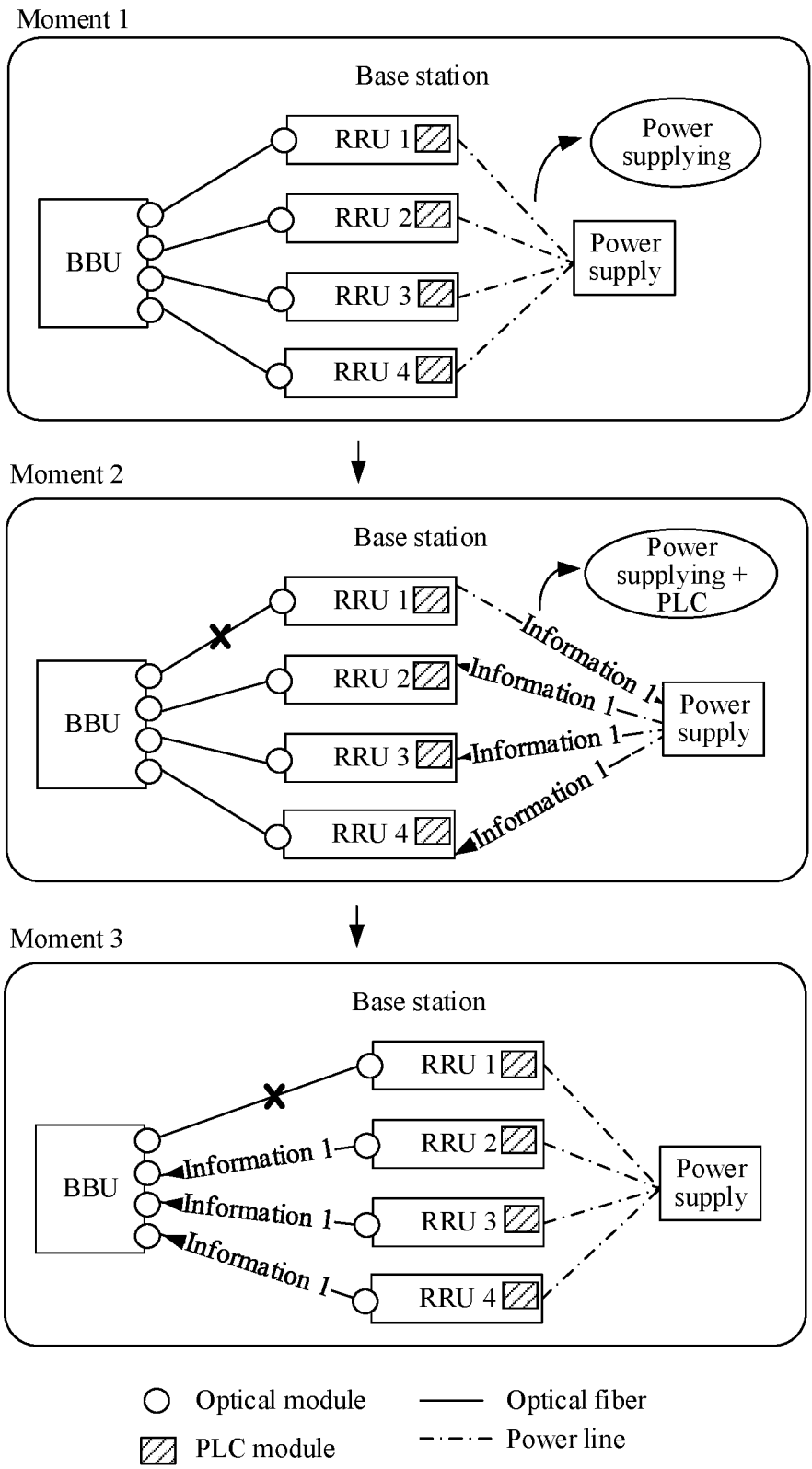
FIG. 3 is a schematic diagram of a communication process according to an embodiment of this application.
Figure 4:
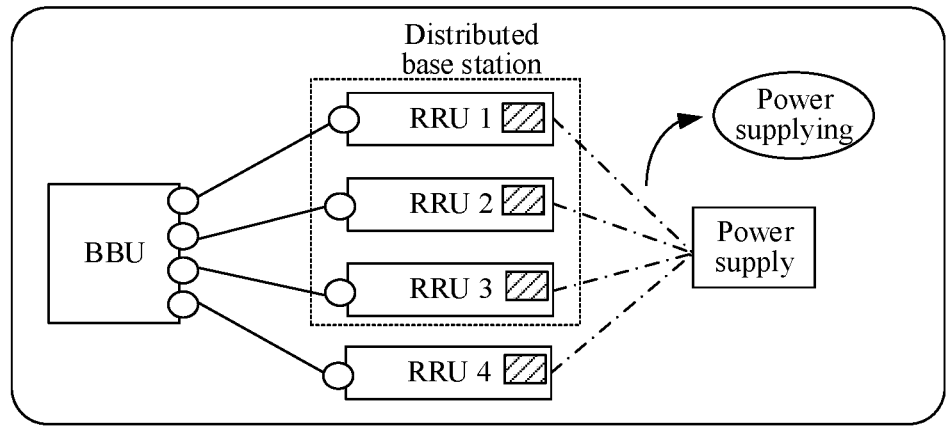
FIG. 4 is a schematic diagram of another communication process according to an embodiment of this application.
Figure 4:
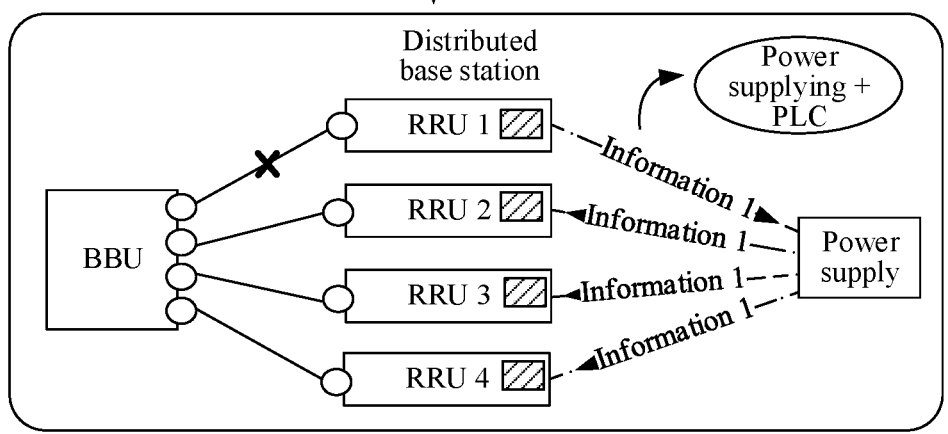
Figure 4:
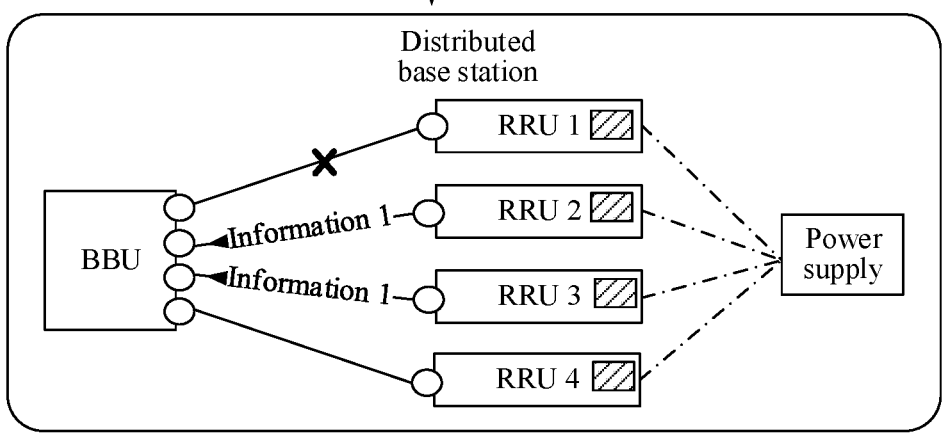

With reference to FIG. 3 and FIG. 4, the following describes the communication method in the embodiment in FIG. 2 in detail by using specific examples.

FIG. 3 is a schematic diagram of a communication process according to an embodiment of this application. Refer to FIG. 3. A base station includes one BBU and four RRUs. The four RRUs are denoted as an RRU 1, an RRU 2, an RRU 3, and an RRU 4. The four RRUs are separately connected to the BBU by using optical modules and optical fibers, the four RRUs are separately connected to a power supply by using a power line, and the four RRUs are further connected to each other by using the power line. A PLC module is disposed in each RRU.

At a moment 1, links between the four RRUs and the BBU are in a normal state. In this case, the power supply supplies power to each RRU by using the power line.

At a moment 2, the RRU 1 may obtain a bit error rate of a communication link between the RRU 1 and the BBU. When the bit error rate is less than a preset threshold, the RRU 1 determines that the link between the RRU 1 and the BBU is faulty and broadcasts first information (referred to as information 1 for short below) by using a PLC module in the RRU 1. The information 1 includes the bit error rate of the communication link between the RRU 1 and the BBU. Because the RRU 1, the RRU 2, the RRU 3, and the RRU 4 are connected to each other by using the power line, each of the RRU 2, the RRU 3, and the RRU 4 may receive, by using respective PLC modules, the information 1 broadcast by the RRU 1. In this case, the power line is used by the power supply to supply power to each RRU and for PLC between the RRUs.

At a moment 3, after receiving the information 1, the RRU 2, the RRU 3, and the RRU 4 separately send the information 1 to the BBU by using the optical fibers. After the BBU receives the information 1, the BBU may determine link quality of the link between the BBU and the RRU 1 based on the bit error rate in the information 1, to determine whether a fault in the link between the BBU and the RRU 1 is caused by poor link quality. For example, if the BBU finds that the bit error rate reported by the RRU 1 is excessively high, the BBU may determine that the quality of the link between the BBU and the RRU 1 is excessively poor. When the BBU determines, based on other information reported by the RRU 1, that the link fault is not caused by the optical module of the RRU 1, the BBU may determine that the fault in the link between the BBU and the RRU 1 is caused by a fault in the optical fiber between the BBU and the RRU 1.

In the foregoing process, after the link between the RRU 1 and the BBU is faulty, the RRU 1 may report the information 1 to the BBU by using other RRUs (the RRU 2, the RRU 3, and the RRU 4) in the base station, so that the BBU may determine fault information in time. Because all of the other RRUs than the RRU 1 in the base station may report the information 1 to the BBU, a probability that the BBU will fail to receive the information 1 may be reduced.

FIG. 4 is a schematic diagram of another communication process according to an embodiment of this application. Refer to FIG. 4. A base station includes one BBU and four RRUs. The four RRUs are denoted as an RRU 1, an RRU 2, an RRU 3, and an RRU 4. The four RRUs are separately connected to the BBU by using optical modules and optical fibers, the four RRUs are separately connected to a power supply by using a power line, and the four RRUs are further connected to each other by using the power line. A PLC module is disposed in each RRU.

After the base station is deployed or the base station is powered on, the BBU may configure an assistant RRU for each RRU. For example, assistant RRUs configured by the BBU for the RRU 1 are the RRU 2 and the RRU 3, and the BBU sends second information to the RRU 2 to the RRU 4, where the second information indicates that the assistant RRUs of the RRU 1 are the RRU 2 and the RRU 3. Optionally, the BBU may further send the second information to the RRU 1, so that the RRU 1 may determine an assistant RRU of the RRU 1.

For example, assuming that the second information includes two fields, a field 1 is for storing an identifier of an assisted RRU, and a field 2 is for storing an identifier of an assistant RRU, the field 1 includes an identifier of the RRU 1, and the field 2 includes an identifier of the RRU 2, an identifier of the RRU 3 (identifiers of the assistant RRUs of the first RRU).

At a moment 1, links between the four RRUs and the BBU are in a normal state. In this case, the power supply supplies power to each RRU by using the power line.

At a moment 2, a link between the RRU 1 and the BBU is faulty. When the RRU 1 detects that the link between the RRU 1 and the BBU is faulty, the RRU 1 broadcasts first information (referred to as information 1 for short below) by using a PLC module in the RRU 1. The information 1 includes information about the RRU 1 and/or information about an optical module connected to the RRU 1. Because the RRU 1, the RRU 2, the RRU 3, and the RRU 4 are connected to each other by using the power line, each of the RRU 2, the RRU 3, and the RRU 4 may receive the information 1 broadcast by the RRU 1. In this case, the power line is used by the power supply to supply power to each RRU and for PLC between the RRUs.

At a moment 3, after the RRU 2 receives the information 1, the RRU 2 determines that the RRU 2 is an assistant RRU of the RRU 1, and then the RRU 2 sends the information 1 to the BBU by using the optical fiber. After the RRU 3 receives the information 1, the RRU 3 determines that the RRU 3 is an assistant RRU of the RRU 1, and then the RRU 3 sends the information 1 to the BBU by using the optical fiber. After the RRU 4 receives the information 1, the RRU 4 determines that the RRU 4 is not an assistant RRU of the RRU 1, and does not send the information 1 to the BBU. Further, the RRU 4 may discard the information 1. After the BBU receives the information 1, the BBU may determine fault information based on the information 1.

In the foregoing process, after the link between the RRU 1 and the BBU is faulty, the RRU 1 may report the first information to the BBU by using the assistant RRUs, so that the BBU may determine the fault information in time. The first information is reported to the BBU by requiring only the assistant RRUs of the RRU 1, leading to low signaling overheads.

Because only an optical fiber link is usually disposed between a BBU and an RRU, in a related technology, to avoid that the BBU cannot enable the RRU to exit a current dormant state, when the RRU is dormant, an interface in the BBU and the RRU is usually not turned disabled, resulting in high power consumption of the base station. Therefore, an architecture of the base station is improved in this application. An improved architecture of the base station may be shown in FIG. 1A to FIG. 1F. In the improved base station, an optical fiber link is disposed between the BBU and each RRU, and different RRUs are connected by using a power line, so that the BBU may enable another RRU to exit a current dormant state by using one RRU. In this way, when an RRU is dormant, an interface in the RRU and the BBU may be disabled, thereby reducing power consumption. The following describes a method in which the BBU enables the RRU to exit the current dormant state by using embodiments shown in FIG. 5 to FIG. 7.

Figure 5:
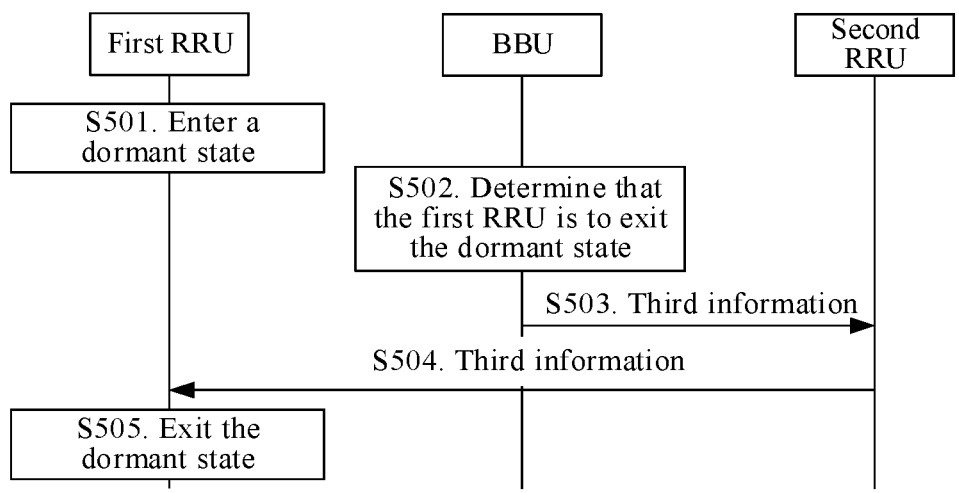
FIG. 5 is a schematic flowchart of another communication method according to an embodiment of this application.

FIG. 5 is a schematic flowchart of another communication method according to an embodiment of this application. Refer to FIG. 5. The method 500 may include the following steps.

S501. A first RRU determines to enter a dormant state.

The first RRU may determine to enter the dormant state under the following conditions:

Condition 1: A BBU sends a dormancy notification message to the first RRU.

When the BBU determines that the first RRU may enter the dormant state, the BBU may send the dormancy notification message to the first RRU, and the first RRU enters the dormant state based on the dormancy notification message.

For example, the BBU may determine a status of the first RRU based on a service volume corresponding to the first RRU. For example, when the service volume corresponding to the first RRU is less than a preset threshold, the first RRU may enter the dormant state.

Condition 2: The first RRU enters the dormant state based on preconfigured information.

Optionally, the preconfigured information includes a dormancy entering moment. When the dormancy entering moment arrives, the first RRU may enter the dormant state.

The preconfigured information may be preconfigured by the BBU, or may be agreed in a protocol.

The dormant state in some embodiments is a deep dormant state. When the first RRU is in the dormant state, the BBU cannot enable the first RRU to exit the current dormant state by using an optical fiber link. The first RRU may enter the dormant state in at least one of the following manners, and the dormant state entered in the following manners is the deep dormant state:

Manner 1: A laser of an optical module connected to the first RRU is turned off.

The optical module connected to the first RRU includes at least one of the following:
- an optical module disposed in the first RRU;
- an optical module disposed in the BBU and configured to communicate with the first RRU;
- an optical module disposed in a cascaded RRU of the first RRU; and
- an optical module disposed in a front RRU of the first RRU and connected to the first RRU.

The cascaded RRU of the first RRU may be an RRU behind the first RRU in a base station. The first RRU may forward a message between the cascaded RRU of the first RRU and the BBU. For example, refer to FIG. 1A to FIG. 1C. None of the RRUs in the base station has a cascaded RRU. Refer to FIG. 1D. Cascaded RRUs of the RRU 11 includes the RRU 12 and the RRU 13, and a cascaded RRU of the RRU 12 is the RRU 13.

The front RRU of the first RRU may be an RRU that is before the first RRU in the base station and that is directly connected to the first RRU. The front RRU of the first RRU may forward a message between the first RRU and the BBU. For example, refer to FIG. 1A to FIG. 1C. None of the RRUs in the base station has a front RRU. Refer to FIG. 1D. A front RRU of the RRU 12 is the RRU 11, and a front RRU of the RRU 13 is the RRU 12.

When the first RRU is different, the optical module connected to the first RRU may be different. This may include the following several cases:

Case 1: The first RRU does not have a cascaded RRU or a front RRU.

In this case, the optical module connected to the first RRU includes: the optical module disposed in the first RRU and the optical module disposed in the BBU and is configured to communicate with the first RRU.

For example, refer to FIG. 1A. Assuming that the first RRU is the RRU 1, an optical module connected to the RRU 1 includes: an optical module A and an optical module B, where the optical module B is an optical module disposed in the RRU 1, and the optical module A is an optical module disposed in the BBU and is configured to communicate with the RRU 1. For example, refer to FIG. 1B. Assuming that the first RRU is the RRU 1, an optical module connected to the RRU 1 includes an optical module A, an optical module B, an optical module C, and an optical module D, where the optical module B and the optical module D are optical modules disposed in the RRU 1, and the optical module A and the optical module C are optical modules disposed in the BBU and configured to communicate with the RRU 1.

Case 2: The first RRU has a cascaded RRU but does not have a front RRU.

In this case, the optical module connected to the first RRU includes: the optical module disposed in the first RRU, the optical module disposed in the BBU and configured to communicate with the first RRU, and the optical module disposed in the cascaded RRU of the first RRU.

For example, refer to FIG. 1D. Assuming that the first RRU is the RRU 11, and the RRU 11 has the cascaded RRU 12 and the cascaded RRU 13, an optical module connected to the RRU 11 includes: an optical module A, an optical module B, an optical module C, an optical module D, an optical module E, and an optical module F. The optical module B and the optical module C are optical modules disposed in the RRU 11, and the optical module A is an optical module disposed in the BBU and configured to communicate with the RRU 11. The optical module D and the optical module E are optical modules disposed in the cascaded RRU 12 of the optical module RRU 11, and the optical module F is an optical module disposed in the cascaded RRU 13 of the optical module RRU 11.

Case 3: The first RRU has a cascaded RRU and a front RRU.

In this case, the optical module connected to the first RRU includes: the optical module disposed in the first RRU, the optical module disposed in the cascaded RRU of the first RRU, and the optical module is disposed in the front RRU of the first RRU and is connected to the first RRU.

For example, refer to FIG. 1D. Assuming that the first RRU is the RRU 12, and the RRU 12 has the cascaded RRU 13 and the front RRU 11, an optical module connected to the RRU 12 includes: an optical module C, an optical module D, an optical module E, and an optical module F. The optical module D and the optical module E are optical modules disposed in the RRU 12, the optical module F is an optical module disposed in the cascaded RRU 13 of the RRU 12, and the optical module C is an optical module disposed in the front RRU 11 of the RRU 12 and connected to the RRU 12.

Case 4: The first RRU has a front RRU but does not have a cascaded RRU.

In this case, the optical module connected to the first RRU includes: the optical module disposed in the first RRU and the optical module disposed in the front RRU of the first RRU and connected to the first RRU.

For example, refer to FIG. 1D. Assuming that the first RRU is the RRU 13, and the RRU 13 has the front RRU 12, an optical module connected to the RRU 13 includes: an optical module E and an optical module F. The optical module F is an RRU disposed in the RRU 13, and the optical module E is an optical module disposed in the front RRU 12 of the RRU 13 and connected to the RRU 13.

In Manner 1, after the laser of the optical module connected to the first RRU is turned off, the laser of the optical module connected to the first RRU stops emitting light. This may reduce power consumption.

Manner 2: Supplying power to the optical module connected to the first RRU is stopped.

Notably, for the optical module connected to the first RRU in this manner, refer to the description in Manner 1. Details are not described herein again.

After supplying power to the optical module connected to the first RRU is stopped, power consumption of the optical module connected to the first RRU may be reduced.

Manner 3: A circuit between the first RRU and the optical module connected to the first RRU is disabled.

Notably, for the optical module connected to the first RRU in this manner, refer to the description in Manner 1. Details are not described herein again.

The circuit between the first RRU and the optical module connected to the first RRU may include: a serializer and deserializer (e.g., SERializer and DESerializer, serdes) high-speed communication interface between the optical module and an interface chip of the first RRU. Disabling the circuit between the first RRU and the optical module connected to the first RRU may mean disabling the serdes high-speed communication interface.

S502. The BBU determines that the first RRU is to exit the dormant state.

The BBU may determine, in a plurality of manners, that the first RRU is to exit the dormant state. For example, the BBU may determine, based on the service volume corresponding to the first RRU, that the first RRU is to exit the dormant state. For example, when the service volume corresponding to the first RRU is greater than or equal to the preset threshold, the BBU determines that the first RRU is to exit the dormant state.

S503. The BBU sends third information to a second RRU, where the third information indicates the first RRU to exit the dormant state.

The second RRU may be any RRU in the base station except for the first RRU, or may be an assistant RRU of the first RRU. For an explanation of the assistant RRU, refer to case 2 in S203. If no assistant RRU is configured for the first RRU, the BBU may send the third information to all or some RRUs except for the first RRU. If an assistant RRU is configured for the first RRU, the BBU may first determine that the assistant RRU of the first RRU is the second RRU, and then send the third information to the second RRU.

Optionally, to avoid a probability that the second RRU and the first RRU are in the dormant state at the same time, the second RRU and the first RRU are usually in a parallel connection relationship. For example, refer to FIG. 1D. Assuming that the first RRU is the RRU 11, the second RRU may be one or more of the RRU 21, the RRU 22, or the RRU 23.

The second RRU may be a directly connected RRU. The BBU may send the third information to the second RRU by using an optical fiber. The third information may include an identifier of the first RRU.

S504. The second RRU sends the third information to the first RRU.

The second RRU and the first RRU may be located in the same base station. A PLC module is disposed in each of the second RRU and the first RRU, and the first RRU is connected to the second RRU through a power line.

Optionally, the second RRU sends the third information to the first RRU by using the PLC module in the second RRU. For example, when the second RRU determines that no optical fiber link exists between the second RRU and the first RRU, or that the optical fiber link between the second RRU and the first RRU is abnormal, the second RRU sends the third information to the first RRU by using the PLC module in the second RRU.

For example, refer to FIG. 1A. Assuming that the second RRU is the RRU 2, and the first RRU is the RRU 1, because no optical fiber link exists between the RRU 2 and the RRU 1, the RRU 2 sends the third information to the RRU 1 by using the PLC module in the RRU 2.

For example, refer to FIG. 1D. Assuming that the second RRU is the RRU 11, and the first RRU is the RRU 12, and assuming that an optical fiber link between the RRU 11 and the RRU 12 is abnormal (for example, power supply is suspended), the RRU 11 sends the third information to the RRU 12 by using the PLC module in the RRU 11.

Optionally, the second RRU may broadcast the third information to the first RRU. After the second RRU broadcasts the third information, RRUs (including the first RRU) connected to the second RRU by using the power line may receive the third information. Alternatively, the second RRU may send the third information to a relay device, and the relay device sends the third information to the first RRU.

S505. The first RRU exits the dormant state.

If the second RRU sends the third information in a broadcast manner, a plurality of RRUs receive the third information. To avoid incorrectly exiting the dormant state, after receiving the third information, the first RRU may determine whether the third information includes the identifier of the first RRU. If the third information includes the identifier of the first RRU, the first RRU exits the dormant state. If the third information does not include the identifier of the first RRU, the first RRU discards the third information.

Optionally, the first RRU may exit the dormant state in the following manner:

If the laser of the optical module connected to the first RRU is in an off state, the laser is turned on.

If power is not supplied to the optical module connected to the first RRU, power is supplied to the optical module connected to the first RRU.

If the circuit between the first RRU and the optical module connected to the first RRU is in a disabled state, the circuit between the first RRU and the optical module connected to the first RRU is enabled.

Optionally, if an RRU is in the dormant state, a cascaded RRU of the RRU is usually also in the dormant state. For example, refer to FIG. 1D. If the RRU 11 is in the dormant state, the RRU 12 and the RRU 13 are usually also in the dormant state.

In the embodiment shown in FIG. 5, the RRU may enter the deep dormant state according to an actual requirement, to reduce power consumption. When the BBU needs the first RRU to exit the dormant state, the BBU may send the third information (the third information is for enabling the first RRU to exit the current dormant state) to the second RRU by using the optical fiber. The second RRU may send the third information to the first RRU by using the power line, to enable the first RRU to exit the dormant state. In the foregoing process, the first RRU may enter the deep dormant state, so that an interface in an RRU and the BBU is in an off state, thereby reducing power consumption.

Figure 6:
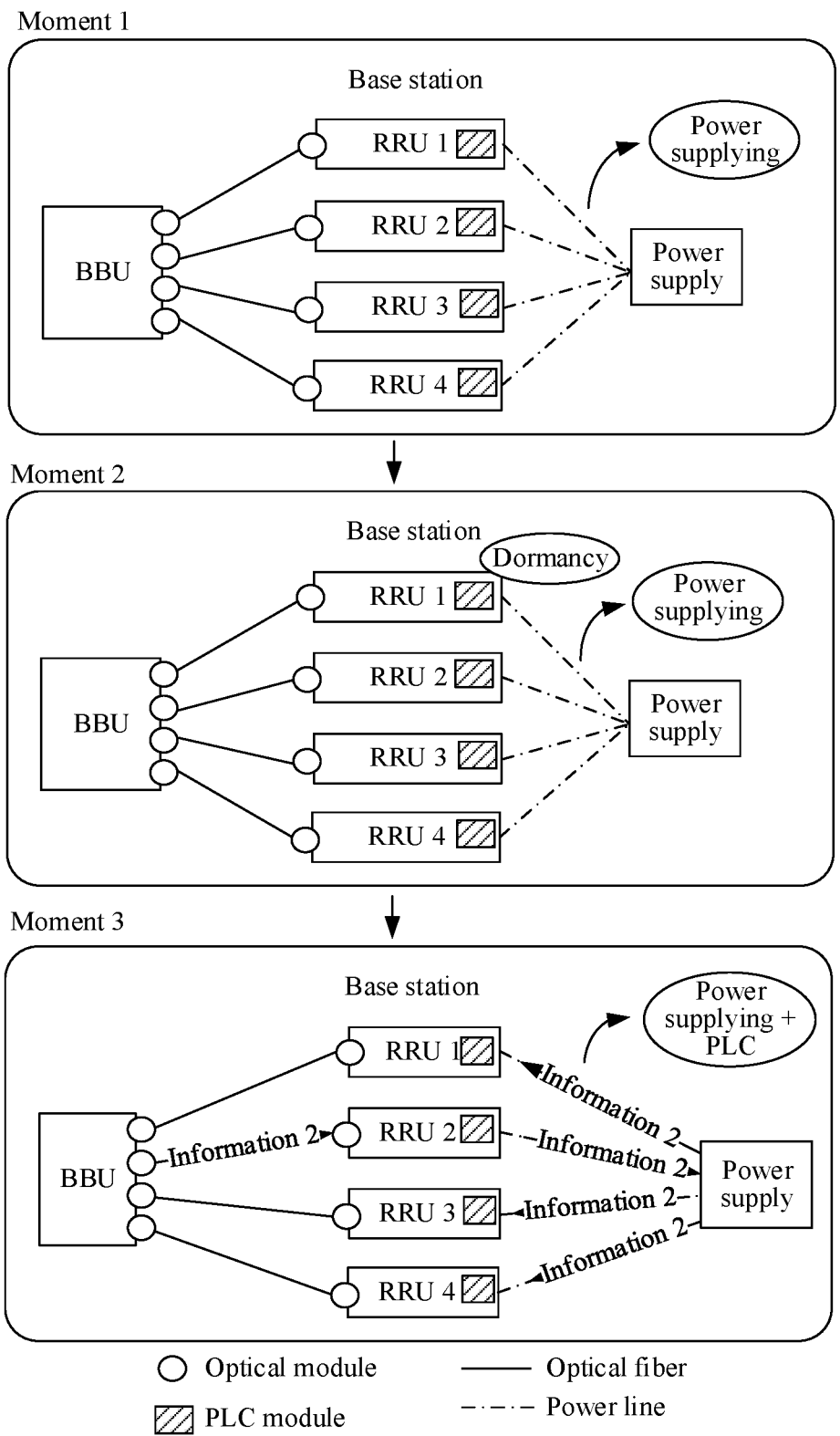
FIG. 6 is a schematic diagram of a communication process according to an embodiment of this application.
Figure 7:
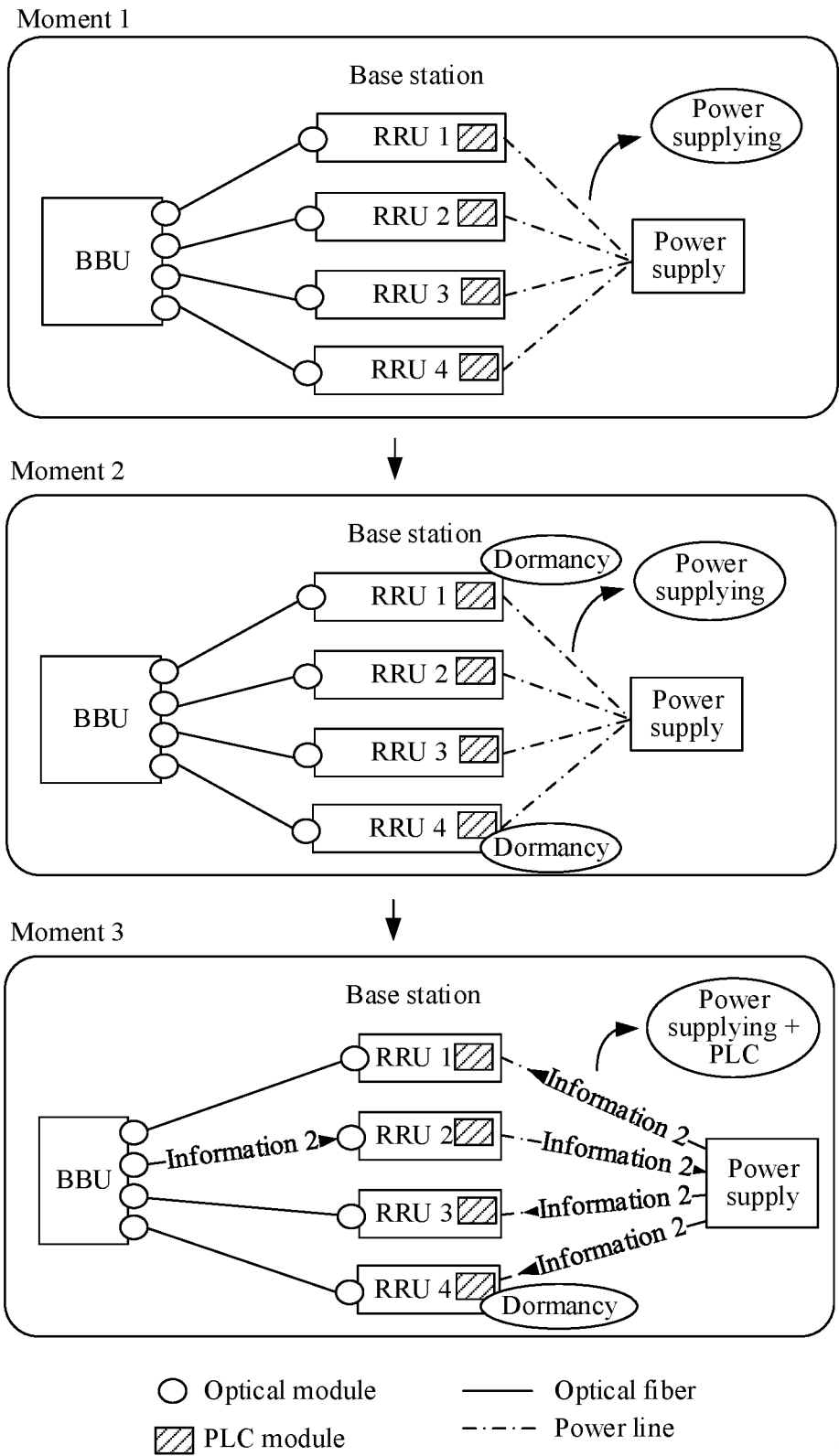
FIG. 7 is a schematic diagram of a communication process according to an embodiment of this application.

With reference to FIG. 6 and FIG. 7, the following describes the communication method in the embodiment in FIG. 5 in detail by using specific examples.

FIG. 6 is a schematic diagram of a communication process according to an embodiment of this application. Refer to FIG. 6. A base station includes one BBU and four RRUs. The four RRUs are denoted as an RRU 1, an RRU 2, an RRU 3, and an RRU 4. The four RRUs are separately connected to the BBU by using optical modules and optical fibers, the four RRUs are separately connected to a power supply by using a power line, and the four RRUs are further connected to each other by using the power line. A PLC module is disposed in each RRU.

At a moment 1, links between the four RRUs and the BBU are in a normal state. In this case, the power supply supplies power to each RRU by using the power line.

At a moment 2, when there is a small service volume corresponding to the RRU 1, the RRU 1 may enter a deep dormant state. In this case, the power line is used by the power supply to supply power to each RRU. Because the RRU 1 enters the deep dormant state, an interface in the RRU and the BBU is in an off state, an amount of power supplied by the power supply to the RRU 1 is reduced.

At a moment 3, assuming that the RRU 1 has much service data, the BBU may send information 2 (third information) to the RRU 2 by using the optical fiber. The information 2 includes an identifier of the RRU 1. After receiving the information 2, the RRU 2 broadcasts the information 2 to another RRU in the base station by using the power line. After the RRU 1 receives the information 2, because the information 2 includes the identifier of the RRU 1, the RRU 1 exits the dormant state based on the information 2. After the RRU 2 to the RRU 4 receive the information 2, because the information 2 includes the identifier of the RRU 1, and the RRU 2 to the RRU 4 are in a non-dormant state, the RRU 2 to the RRU 4 may discard the information 2.

FIG. 7 is a schematic diagram of a communication process according to an embodiment of this application. Refer to FIG. 6. A base station includes one BBU and four RRUs. The four RRUs are denoted as an RRU 1, an RRU 2, an RRU 3, and an RRU 4. The four RRUs are separately connected to the BBU by using optical modules and optical fibers, the four RRUs are separately connected to a power supply by using a power line, and the four RRUs are further connected to each other by using the power line. A PLC module is disposed in each RRU.

At a moment 1, links between the four RRUs and the BBU are in a normal state. In this case, the power line is used by the power supply to supply power to each RRU.

At a moment 2, when there is a small amount of service data corresponding to the RRU 1 and the RRU 4, both the RRU 1 and the RRU 4 may enter a deep dormant state. In this case, the power line is used by the power supply to supply power to each RRU. Because the RRU 1 and the RRU 4 enter the deep dormant state, an amount of power supplied by the power supply to the RRU 1 and the RRU 4 is reduced.

At a moment 3, assuming that the RRU 1 has much service data, the BBU may send information 2 (third information) to the RRU 2 by using the optical fiber, where the information 2 includes an identifier of the RRU 1. After receiving the information 2, the RRU 2 broadcasts the information 2 to another RRU in the base station by using the power line. After the RRU 1 receives the information 2, because the information 2 includes the identifier of the RRU 1, the RRU 1 exits the dormant state based on the information 2. After the RRU 2 and the RRU 3 receive the information 2, because the RRU 2 and the RRU 3 are in a non-dormant state, the RRU 2 and the RRU 3 may discard the information 2. After the RRU 4 receives the information 2, because the information 2 does not include an identifier of the RRU 4, the RRU 4 may not exit the dormant state, and may further discard the information 2.

Figure 8:
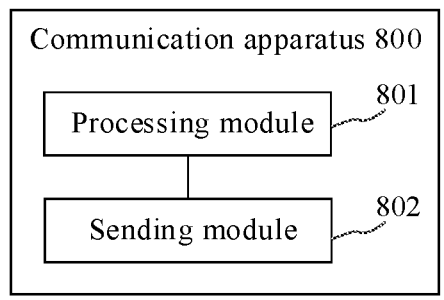
FIG. 8 is a schematic diagram of a structure of a communication apparatus according to an embodiment of this application.

FIG. 8 is a schematic diagram of a structure of a communication apparatus according to an embodiment of this application. The communication apparatus 800 may be disposed in a first RRU. Refer to FIG. 8. The communication apparatus 800 may include a processing module 801 and a sending module 802.

The processing module 801 is configured to determine that a link between the first RRU and a BBU is in an abnormal state.

The sending module 802 is configured to send first information to at least one second RRU by using a PLC module in the first RRU, where the first information includes information about the first RRU and/or information about an optical module connected to the first RRU.

The first RRU is connected to the at least one second RRU by using a power line, and a PLC module is disposed in the at least one second RRU.

Optionally, the processing module 801 may perform S201 in the embodiment in FIG. 2.

Optionally, the sending module 802 may perform S202 in the embodiment in FIG. 2.

Notably, the communication apparatus 800 provided in some embodiments may perform the technical solutions in the foregoing method embodiments. Their implementation principles and beneficial effects are similar, and details are not described herein again.

In a possible implementation, the sending module 802 is configured to: broadcast the first information to the at least one second RRU by using the PLC module in the first RRU.

In a possible implementation, the processing module 801 is configured to: determine that the link is in the abnormal state if the first RRU receives no heartbeat packet from the BBU within first duration.

In a possible implementation, the information about the first RRU includes at least one of the following information: an identifier of the first RRU, information about a radio frequency module of the first RRU, a bit error rate of the communication link between the first RRU and the BBU, running duration of the first RRU, or a quantity of reset times of the first RRU in a first time period.

In a possible implementation, the information about the optical module includes at least one of the following information: an identifier of the optical module, optical power of the optical module, a bias current of the optical module, device information of the optical module, or fault information of the optical module.

Notably, the communication apparatus 800 provided in some embodiments may perform the technical solutions in the foregoing method embodiments. Their implementation principles and beneficial effects are similar, and details are not described herein again.

Figure 9:
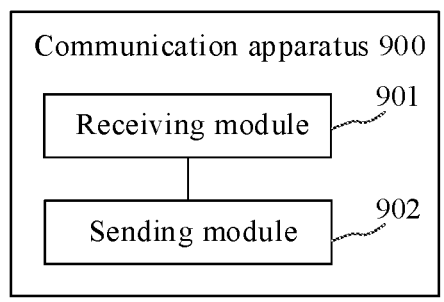
FIG. 9 is a schematic diagram of a structure of another communication apparatus according to an embodiment of this application.

FIG. 9 is a schematic diagram of a structure of another communication apparatus according to an embodiment of this application. The communication apparatus 900 may be disposed in a second RRU. Refer to FIG. 9. The communication apparatus 900 may include: a receiving module 901 and a sending module 902.

The receiving module 901 is configured to receive first information from a first RRU by using a PLC module in the second RRU, where the first information includes information about the first RRU and/or information about an optical module connected to the first RRU.

The sending module 902 is configured to send the first information to a BBU.

The first RRU is connected to the second RRU through a power line, and the PLC module is disposed in the second RRU.

Optionally, the receiving module 901 may perform S202 in the embodiment in FIG. 2.

Optionally, the sending module 902 may perform S203 in the embodiment in FIG. 2.

Notably, the communication apparatus 900 provided in some embodiments may perform the technical solutions in the foregoing method embodiments. Their implementation principles and beneficial effects are similar, and details are not described herein again.

In a possible implementation, the sending module 902 is configured to: send the first information to the BBU when it is determined that the second RRU is an assistant RRU of the first RRU.

Figure 10:
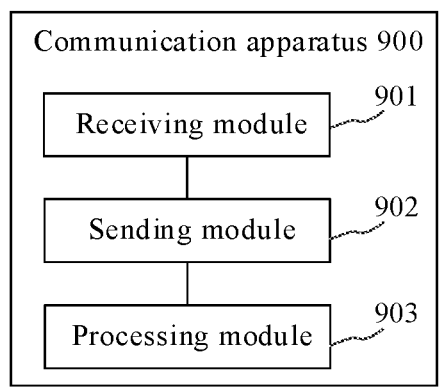
FIG. 10 is a schematic diagram of a structure of still another communication apparatus according to an embodiment of this application.

FIG. 10 is a schematic diagram of a structure of still another communication apparatus according to an embodiment of this application. Based on the embodiment shown in FIG. 9, refer to FIG. 10. The communication apparatus 900 may further include a processing module 903. The processing module 903 is configured to: obtain second information;

and determine, based on the second information, that the second RRU is the assistant RRU of the first RRU, where the second information includes an identifier of the first RRU.

In a possible implementation, the receiving module 901 is further configured to receive the second information from the BBU or the first RRU; or the processing module 903 is further configured to obtain the second information from preset storage space.

In a possible implementation, the information about the first RRU includes at least one of the following information: the identifier of the first RRU, information about a radio frequency module of the first RRU, running duration of the first RRU, or a quantity of reset times of the first RRU in a first time period.

In a possible implementation, the information about the optical module includes at least one of the following information: an identifier of the optical module, optical power of the optical module, a bit error rate of the optical module, a bias current of the optical module, device information of the optical module, or fault information of the optical module.

Notably, the communication apparatus 900 provided in some embodiments may perform the technical solutions in the foregoing method embodiments. Their implementation principles and beneficial effects are similar, and details are not described herein again.

Figure 11:
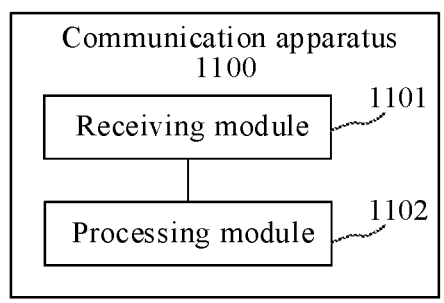
FIG. 11 is a schematic diagram of a structure of yet another communication apparatus according to an embodiment of this application.

FIG. 11 is a schematic diagram of a structure of yet another communication apparatus according to an embodiment of this application. The communication apparatus 1100 may be disposed in a BBU. Refer to FIG. 11. The communication apparatus 1100 may include: a receiving module 1101 and a processing module 1102.

The receiving module 1101 is configured to receive first information sent by a second RRU, where the first information includes information about a first RRU and/or information about an optical module connected to the first RRU.

The processing module 1102 is configured to determine fault information based on the first information.

The first RRU is connected to the second RRU through a power line, and a PLC module is disposed in each of the first RRU and the second RRU.

Optionally, the receiving module 1101 may perform S203 in the embodiment in FIG. 2.

Optionally, the processing module 1102 may perform S204 in the embodiment in FIG. 2.

Notably, the communication apparatus 1100 provided in some embodiments may perform the technical solutions in the foregoing method embodiments. Their implementation principles and beneficial effects are similar, and details are not described herein again.

In a possible implementation, the fault information includes at least one of the following information: a fault in the first RRU, a fault in the optical module connected to the first RRU, or a fault in an optical fiber between the first RRU and the BBU.

Figure 12:
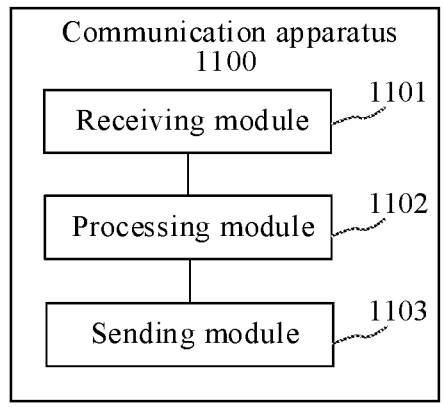
FIG. 12 is a schematic diagram of a structure of another communication apparatus according to an embodiment of this application.

FIG. 12 is a schematic diagram of a structure of another communication apparatus according to an embodiment of this application. Based on the embodiment shown in FIG. 11, refer to FIG. 12. The communication apparatus 1100 may further include a sending module 1103.

The processing module 1102 is further configured to determine that an assistant RRU of the first RRU is the second RRU.

The sending module 1103 is configured to send second information to the second RRU, where the second information includes an identifier of the first RRU.

In a possible implementation, the information about the first RRU includes at least one of the following information: the identifier of the first RRU, information about a radio frequency module of the first RRU, running duration of the first RRU, or a quantity of reset times of the first RRU in a first time period.

In a possible implementation, the information about the optical module includes at least one of the following information: an identifier of the optical module, optical power of the optical module, a bit error rate of the optical module, a bias current of the optical module, device information of the optical module, or fault information of the optical module connected to the first RRU.

Notably, the communication apparatus 1100 provided in some embodiments may perform the technical solutions in the foregoing method embodiments. Their implementation principles and beneficial effects are similar, and details are not described herein again.

Figure 13:
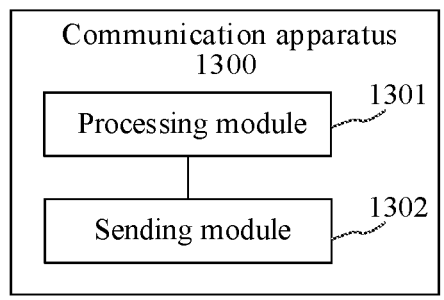
FIG. 13 is a schematic diagram of a structure of yet another communication apparatus according to an embodiment of this application.

FIG. 13 is a schematic diagram of a structure of yet another communication apparatus according to an embodiment of this application. The communication apparatus 1300 may be disposed in a BBU. Refer to FIG. 13. The communication apparatus 1300 may include a processing module 1301 and a sending module 1302.

The processing module 1301 is configured to determine that a first RRU is to exit a dormant state.

The sending module 1302 is configured to send third information to a second RRU, where the third information indicates the first RRU to exit the dormant state.

The first RRU is connected to the second RRU through a power line, and a PLC module is disposed in each of the first RRU and the second RRU.

That the first RRU enters the dormant state includes at least one of the following: turning off a laser of an optical module connected to the first RRU, stopping supplying power to an optical module connected to the first RRU, or disabling a circuit between the first RRU and an optical module connected to the first RRU.

Optionally, the processing module 1301 may perform S502 in the embodiment in FIG. 5.

Optionally, the sending module 1302 may perform S503 in the embodiment in FIG. 5.

Notably, the communication apparatus 1300 provided in some embodiments may perform the technical solutions in the foregoing method embodiments. Their implementation principles and beneficial effects are similar, and details are not described herein again.

In a possible implementation, the third information indicates the second RRU to enable, by using the PLC module in the second RRU, the first RRU to exit the dormant state.

In a possible implementation, the optical module connected to the first RRU includes at least one of the following: an optical module disposed in the first RRU, an optical module disposed in the BBU and configured to communicate with the first RRU, an optical module disposed in a cascaded RRU of the first RRU, or an optical module disposed in a front RRU of the first RRU and connected to the first RRU.

Notably, the communication apparatus 1300 provided in some embodiments may perform the technical solutions in the foregoing method embodiments. Their implementation principles and beneficial effects are similar, and details are not described herein again.

Figure 14:
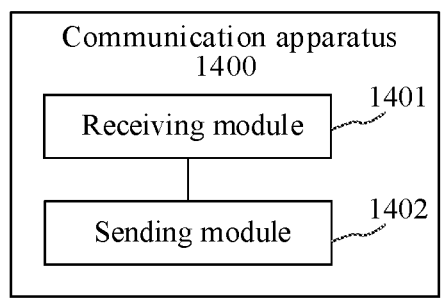
FIG. 14 is a schematic diagram of a structure of still another communication apparatus according to an embodiment of this application.

FIG. 14 is a schematic diagram of a structure of still another communication apparatus according to an embodiment of this application. The communication apparatus 1400 may be disposed in a second RRU. Refer to FIG. 14. The communication apparatus 1400 may include: a receiving module 1401 and a sending module 1402.

The receiving module 1401 is configured to receive third information from a baseband unit BBU, where the third information indicates a first RRU to exit a dormant state.

The sending module 1402 is configured to send the third information to the first RRU by using a PLC module in the second RRU.

The first RRU is connected to the second RRU through a power line, and a PLC module is disposed in each of the first RRU and the second RRU.

Optionally, the receiving module 1401 may perform S503 in the embodiment in FIG. 5.

Optionally, the sending module 1402 may perform S504 in the embodiment in FIG. 5.

Notably, the communication apparatus 1400 provided in some embodiments may perform the technical solutions in the foregoing method embodiments. Their implementation principles and beneficial effects are similar, and details are not described herein again.

Figure 15:
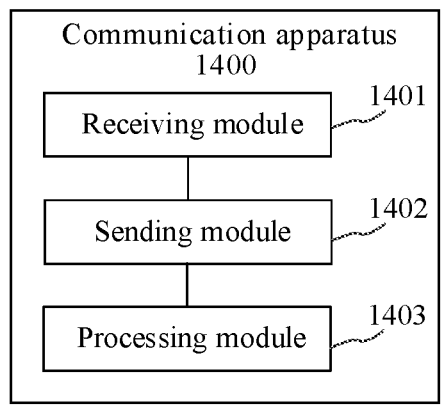
FIG. 15 is a schematic diagram of a structure of another communication apparatus according to an embodiment of this application.

FIG. 15 is a schematic diagram of a structure of another communication apparatus according to an embodiment of this application. Based on the embodiment shown in FIG. 14, refer to FIG. 15. The communication apparatus 1400 may further include a processing module 1403.

The processing module 1403 is configured to determine that no optical fiber link exists between the second RRU and the first RRU, or that an optical fiber link between the second RRU and the first RRU is abnormal.

The sending module 1402 is configured to send the third information to the first RRU by using the PLC module in the second RRU.

In a possible implementation, the first RRU in the dormant state meets at least one of the following conditions: a laser of an optical module connected to the first RRU is in an off state, a power supply status of an optical module connected to the first RRU is unpowered, or a circuit between the first RRU and an optical module connected to the first RRU is in a disabled state.

In a possible implementation, the optical module connected to the first RRU includes at least one of the following: an optical module disposed in the first RRU, an optical module disposed in the BBU and configured to communicate with the first RRU, an optical module disposed in a cascaded RRU of the first RRU, or an optical module disposed in a front RRU of the first RRU and connected to the first RRU.

Notably, the communication apparatus 1400 provided in some embodiments may perform the technical solutions in the foregoing method embodiments. Their implementation principles and beneficial effects are similar, and details are not described herein again.

Figure 16:
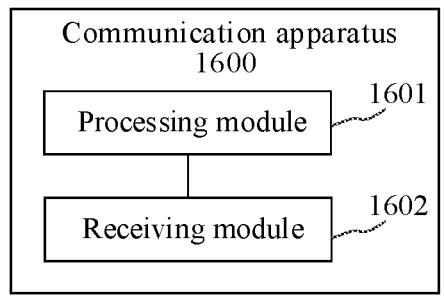
FIG. 16 is a schematic diagram of a structure of still another communication apparatus according to an embodiment of this application.

FIG. 16 is a schematic diagram of a structure of still another communication apparatus according to an embodiment of this application. The communication apparatus 1600 may be disposed in a first RRU. Refer to FIG. 16. The communication apparatus 1600 may include: a processing module 1601 and a receiving module 1602.

The processing module 1601 is configured to determine to enter a dormant state.

The receiving module 1602 is configured to receive third information from a second RRU by using a PLC module in the first RRU.

The processing module 1601 is further configured to determine to exit the dormant state.

The first RRU is connected to the second RRU through a power line, and a PLC module is disposed in the second RRU.

Optionally, the processing module 1601 may perform S501 and S505 in the embodiment in FIG. 5.

Optionally, the receiving module 1602 may perform S504 in the embodiment in FIG. 5.

Notably, the communication apparatus 1600 provided in some embodiments may perform the technical solutions in the foregoing method embodiments. Their implementation principles and beneficial effects are similar, and details are not described herein again.

In a possible implementation, the entering a dormant state includes at least one of the following: turning off a laser of an optical module connected to the first RRU, stopping supplying power to an optical module connected to the first RRU, or disabling a circuit between the first RRU and an optical module connected to the first RRU.

In a possible implementation, the first RRU in the dormant state meets at least one of the following conditions: the laser of the optical module connected to the first RRU is in an off state, a power supply status of the optical module connected to the first RRU is unpowered, or the circuit between the first RRU and the optical module connected to the first RRU is in a disabled state.

In a possible implementation, the optical module connected to the first RRU includes at least one of the following: an optical module disposed in the first RRU, an optical module disposed in a BBU and configured to communicate with the first RRU, an optical module disposed in a cascaded RRU of the first RRU, or an optical module disposed in a front RRU of the first RRU and connected to the first RRU.

Notably, the communication apparatus 1600 provided in some embodiments may perform the technical solutions in the foregoing method embodiments. Their implementation principles and beneficial effects are similar, and details are not described herein again.

Figure 17:
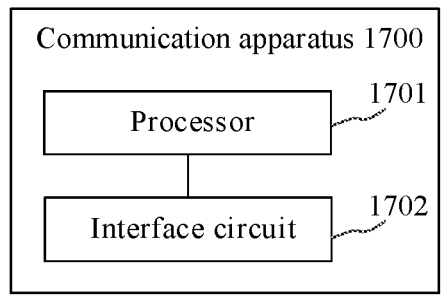
FIG. 17 is a schematic diagram of a structure of a communication apparatus according to an embodiment of this application.

FIG. 17 is a schematic diagram of a structure of a communication apparatus according to an embodiment of this application. Refer to FIG. 17. The communication apparatus 1700 may include: at least one processor 1701 and an interface circuit 1702. The interface circuit 1702 is configured to: receive a signal from a communication apparatus other than the communication apparatus and transmit the signal to the processor or send a signal from the processor to a communication apparatus other than the communication apparatus. The processor is configured to implement the method described in the foregoing method embodiments by using a logic circuit or by executing code instructions.

Optionally, the communication apparatus 1700 may be disposed in a first RRU, a second RRU, or a BBU.

When the communication apparatus 1700 is disposed in the first RRU, the communication apparatus may implement a function of the first RRU in the foregoing method embodiments. When the communication apparatus 1700 is disposed in the second RRU, the communication apparatus may implement a function of the second RRU in the foregoing method embodiments. When the communication apparatus 1700 is disposed in the BBU, the communication apparatus may implement a function of the BBU in the foregoing method embodiments.

Notably, the communication apparatus 1700 in the embodiment in FIG. 17 may perform the technical solutions in the foregoing method embodiments. Their implementation principles and beneficial effects are similar, and details are not described herein again.

Figure 18:
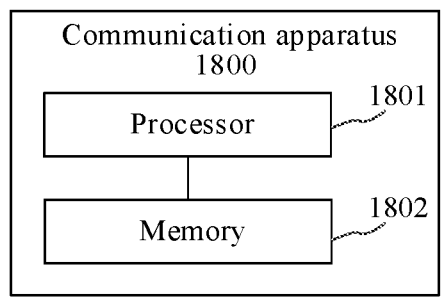
FIG. 18 is a schematic diagram of a structure of another communication apparatus according to an embodiment of this application.

FIG. 18 is a schematic diagram of a structure of another communication apparatus according to an embodiment of this application. Refer to FIG. 18. The communication apparatus 1800 may include: at least one processor 1801 and a memory 1802, where the processor 1801 is coupled to the memory 1802, the memory 1802 includes a computer program, and the computer program is executed in the at least one processor 1801, to implement a function of the first RRU, the second RRU, or the BBU described above.

Optionally, the communication apparatus 1800 may be disposed in the first RRU, the second RRU, or the BBU.

When the communication apparatus 1800 is disposed in the first RRU, the communication apparatus may implement the function of the first RRU in the foregoing method embodiments. When the communication apparatus 1800 is disposed in the second RRU, the communication apparatus may implement the function of the second RRU in the foregoing method embodiments. When the communication apparatus 1800 is disposed in the BBU, the communication apparatus may implement the function of the BBU in the foregoing method embodiments.

Notably, the communication apparatus 1800 in the embodiment in FIG. 18 may perform the technical solutions in the foregoing method embodiments. Their implementation principles and beneficial effects are similar, and details are not described herein again.

Figure 19:
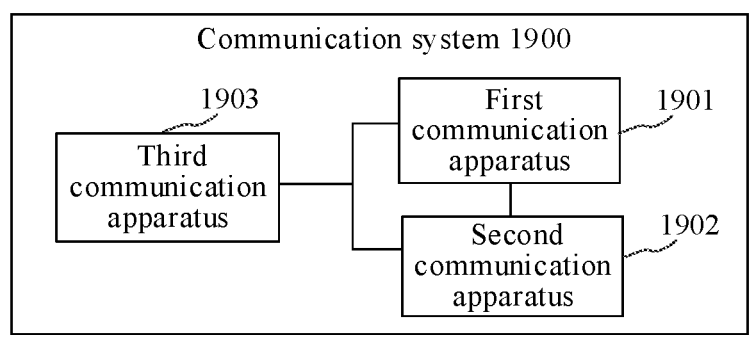
FIG. 19 is a schematic diagram of a structure of a communication system according to an embodiment of this application.

FIG. 19 is a schematic diagram of a structure of a communication system according to an embodiment of this application. Refer to FIG. 19. The communication system 1900 includes a first communication apparatus 1901, a second communication apparatus 1902, and a third communication apparatus 1903.

The first communication apparatus 1901 may be a communication apparatus 1700 disposed in a first RRU.

The second communication apparatus 1902 may be a communication apparatus 1700 disposed in a second RRU.

The third communication apparatus 1903 may be a communication apparatus 1700 disposed in a BBU.

Notably, the communication system in the embodiment in FIG. 19 may perform the technical solutions in the foregoing method embodiments. Their implementation principles and beneficial effects are similar, and details are not described herein again.

An embodiment of this application further provides a communication apparatus. The communication apparatus is configured to perform the technical solutions in any one of the foregoing method embodiments.

An embodiment of this application further provides a computer-readable storage medium. The computer-readable storage medium stores a computer program or instructions. When the computer program or the instructions are executed, the technical solutions in any one of the foregoing method embodiments are implemented.

An embodiment of this application further provides a computer program product, including a computer program. When the computer program is run on a computer device, the computer device is enabled to perform the technical solutions in any one of the foregoing method embodiments.

All or some of the steps of the foregoing method embodiments may be implemented by a program instructing related hardware. The foregoing program may be stored in a readable memory. When the program is executed, the steps of the methods in embodiments are performed. The memory (storage medium) includes: a read-only memory (ROM for short), a random-access memory (RAM), a flash memory, a hard disk, a solid state drive (SSD), a magnetic tape, a floppy disk, an optical disc, and any combination thereof.

Embodiments of this application are described with reference to the flowcharts and/or block diagrams of the method, the device (system), and the computer program product according to embodiments of this application. It can be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of another programmable data processing device to generate a machine, so that the instructions executed by the computer or the processing unit of the another programmable data processing device generate an apparatus for implementing a specified function in one or more processes in the flowcharts and/or in one or more blocks in the block diagrams.

These computer program instructions, instructing the computer or the another programmable data processing device to work in a specific manner, may alternatively be stored in a computer-readable memory, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to embodiments of this application without departing from the spirit and scope of this application. This application is intended to cover these modifications and variations provided that they fall within the scope of protection defined by the following claims and their equivalent technologies in this application.

In this application, the term "when . . . " does not necessarily mean a concept of time, and may indicate a concept of a scenario, a concept of a condition, or the like. The term "including" and a variant thereof may refer to non-limitative inclusion; and the term "or" and a variant thereof may refer to "and/or". In this application, the terms "first", "second", and the like are intended to distinguish between similar objects but do not necessarily indicate a specific order or sequence. "A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

What is claimed is:

1. A communication apparatus, which is a first remote radio unit (RRU) or included in the first RRU, wherein the communication apparatus comprises a processor coupled to a memory; and the memory is configured to store a computer program, wherein the processor is configured to execute the computer program stored in the memory, to cause the communication apparatus to perform operations comprising:

determining that a link between the first RRU and a baseband unit (BBU) is in an abnormal state; and sending first information to at least one second RRU by using a power line communication (PLC) module in the first RRU, wherein the first information comprises at least one of information about the first RRU or information about an optical module connected to the first RRU; and the first RRU is connected to the at least one second RRU through a power line, and a PLC module is disposed in the at least one second RRU;

wherein the sending of the first information to the at least one second RRU by using the PLC module in the first RRU comprises:

broadcasting the first information to the at least one second RRU by using the PLC module in the first RRU.

2. The apparatus according to claim 1, wherein the determining that the link between the first RRU and the BBU is in the abnormal state comprises:

determining that the link is in the abnormal state when the first RRU does not receive a heartbeat packet from the BBU within a first duration.

3. The apparatus according to claim 1, wherein the information about the first RRU comprises at least one of the following types of information: an identifier of the first RRU, information about a radio frequency module of the first RRU, a bit error rate of the communication link between the first RRU and the BBU, a running duration of the first RRU, or a quantity of reset times of the first RRU in a first time period.

4. The apparatus according to claim 1, wherein the information about the optical module comprises at least one of the following types of information:

an identifier of the optical module, optical power of the optical module, a bias current of the optical module, device information of the optical module, or fault information of the optical module.

5. A communication apparatus, which is a first remote radio unit (RRU) or included in the first RRU, wherein the communication apparatus comprises a processor coupled to a memory; and the memory is configured to store a computer program, wherein the processor is configured to execute the computer program stored in the memory, to cause the communication apparatus to perform operations comprising:

receiving first information from a second RRU by using a power line communication (PLC) module in the first RRU, wherein the first information comprises at least one of information about the second RRU or information about an optical module connected to the second RRU; and sending the first information to a baseband unit (BBU), wherein the second RRU is connected to the first RRU through a power line, and the PLC module is disposed in the first RRU; and the first information from the second RRU is broadcasted by using the PLC module in the second RRU.

6. The apparatus according to claim 5, wherein the sending of the first information to the BBU comprises:

sending the first information to the BBU when determining that the first RRU is an assistant RRU of the second RRU.

7. The apparatus according to claim 6, wherein the determining that the first RRU is the assistant RRU of the second RRU comprises:

obtaining second information; and determining, based on the second information, that the first RRU is the assistant RRU of the second RRU, wherein the second information comprises an identifier of the second RRU.

8. The apparatus according to claim 7, wherein the obtaining of the second information comprises:

receiving the second information from the BBU or the second RRU; or obtaining the second information from preset storage space.

9. The apparatus according to claim 5, wherein the information about the second RRU comprises at least one of the following types of information: an identifier of the second RRU, information about a radio frequency module of the second RRU, a running duration of the second RRU, or a quantity of reset times of the second RRU in a first time period.

10. The apparatus according to claim 5, wherein the information about the optical module comprises at least one of the following types of information: an identifier of the optical module, optical power of the optical module, a bit error rate of the optical module, a bias current of the optical module, device information of the optical module, or fault information of the optical module.

11. A communication apparatus, which is a baseband unit (BBU) or included in the BBU, wherein the communication apparatus comprises a processor coupled to a memory; and the memory is configured to store a computer program, wherein the processor is configured to execute the computer program stored in the memory, to cause the communication apparatus to perform operations comprising:

receiving first information sent by a first remote radio unit (RRU), wherein the first information comprises at least one of information about a second RRU or information about an optical module connected to the second RRU; and determining fault information based on the first information, wherein the second RRU is connected to the first RRU through a power line, and a power line communication (PLC) module is disposed in each of the first RRU and the second RRU; and the first information sent by the first RRU to the BBU is broadcasted by using the PLC module in the first RRU.

12. The apparatus according to claim 11, wherein the fault information comprises at least one of the following information: a fault in the second RRU, a fault in the optical module connected to the second RRU, or a fault in an optical fiber between the second RRU and the BBU.

13. The apparatus according to claim 11, wherein the operations further comprise:

determining that an assistant RRU of the second RRU is the first RRU; and sending second information to the first RRU, wherein the second information comprises an identifier of the second RRU.

14. The apparatus according to claim 11, wherein the information about the second RRU comprises at least one of the following types of information: an identifier of the second RRU, information about a radio frequency module of the second RRU, running duration of the second RRU, or a quantity of reset times of the second RRU in a first time period.

15. The apparatus according to claim 11, wherein the information about the optical module comprises at least one of the following types of information: an identifier of the optical module, optical power of the optical module, a bit error rate of the optical module, a bias current of the optical module, device information of the optical module, or fault information of the optical module connected to the second RRU.

16. The apparatus according to claim 11, wherein the BBU receives the first information sent by the first RRU in response to the BBU not sending a heartbeat packet to the first RRU within a first duration.

* * * * *